(12) United States Patent
Yamamoto et al.

(10) Patent No.: US 10,721,379 B2
(45) Date of Patent: Jul. 21, 2020

(54) ELECTRONIC APPARATUS THAT EFFICIENTLY DISSIPATES HEAT FROM RECORDING MEDIUM

(71) Applicant: CANON KABUSHIKI KAISHA, Tokyo (JP)

(72) Inventors: Kazuo Yamamoto, Tokyo (JP); Hayato Mano, Tokyo (JP); Yuta Nakamura, Tokyo (JP); Futoshi Iinuma, Yokohama (JP); Hiroshi Yano, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/916,604

(22) Filed: Mar. 9, 2018

(65) Prior Publication Data
US 2018/0278814 A1 Sep. 27, 2018

(30) Foreign Application Priority Data

Mar. 24, 2017 (JP) .................. 2017-059174
Dec. 8, 2017 (JP) .................. 2017-236267

(51) Int. Cl.
*H04N 5/225* (2006.01)
*G02B 7/02* (2006.01)
*H04N 5/232* (2006.01)

(52) U.S. Cl.
CPC ............. *H04N 5/2253* (2013.01); *G02B 7/02* (2013.01); *H04N 5/2254* (2013.01); *H04N 5/22521* (2018.08); *H04N 5/23293* (2013.01)

(58) Field of Classification Search
CPC .... G02B 7/02; H04N 5/22521; H04N 5/2253; H04N 5/2254; H04N 5/23293
See application file for complete search history.

(56) References Cited

U.S. PATENT DOCUMENTS

| 10,205,930 B2* | 2/2019 | Van Hoff ............. H04N 13/271 |
| 2004/0169771 A1* | 9/2004 | Washington ......... H04N 5/2251 348/374 |
| 2006/0055820 A1* | 3/2006 | Lyon ................ G08B 13/19619 348/373 |
| 2008/0074509 A1* | 3/2008 | Sano ...................... G03B 17/55 348/231.3 |
| 2008/0089678 A1* | 4/2008 | Suzuki .................. G03B 17/55 396/439 |
| 2009/0168353 A1* | 7/2009 | Kato .................... H04N 5/2252 361/697 |

(Continued)

FOREIGN PATENT DOCUMENTS

JP 2013093697 A 5/2013

*Primary Examiner* — Amy R Hsu
(74) *Attorney, Agent, or Firm* — Rossi, Kimms & McDowell LLP

(57) ABSTRACT

An electronic apparatus capable of separating and dissipating heat generated by a plurality of heat sources. The electronic apparatus includes a main circuit board and an image pickup device unit, as heat sources. A first duct unit is disposed between the main circuit board and the image pickup device unit, and dissipates heat from the image pickup device unit to an outside. A second duct unit is disposed at a position where the second duct unit and the first duct unit sandwich the main circuit board, and dissipates heat from the main circuit board to the outside.

41 Claims, 25 Drawing Sheets

(56) References Cited

U.S. PATENT DOCUMENTS

| | | | |
|---|---|---|---|
| 2012/0243168 A1* | 9/2012 | Tanaka | H04N 5/2251 361/679.32 |
| 2014/0055671 A1* | 2/2014 | Kawamura | H04N 5/2252 348/374 |
| 2015/0009419 A1* | 1/2015 | Hosoki | G02F 1/133615 348/794 |
| 2015/0192729 A1* | 7/2015 | Hosoki | G02F 1/133308 348/794 |
| 2016/0295079 A1* | 10/2016 | Jannard | H04N 5/2257 |
| 2017/0054965 A1* | 2/2017 | Raab | G06T 7/70 |
| 2018/0013271 A1* | 1/2018 | Goulden | H02G 3/04 |
| 2018/0013934 A1* | 1/2018 | Germe | H04N 5/2252 |

* cited by examiner

ELECTRONIC APPARATUS THAT EFFICIENTLY DISSIPATES HEAT FROM RECORDING MEDIUM

BACKGROUND OF THE INVENTION

Field of the Invention

The present invention relates to an electronic apparatus that includes a plurality of heat sources and efficiently dissipates heat from a recording medium.

Description of the Related Art

In a digital video camera, a digital still camera, and so forth, due to the recent demand for reduction of the size of an electronic apparatus, space is reduced in which are disposed a sensor circuit board having an image pickup device mounted thereon and a main circuit board having electronic components mounted thereon for processing control signals and image signals, and hence a distance between the circuit boards is reduced. Further, due to the advance of techniques for mounting the circuit boards, the mounting density of electronic components mounted on the circuit boards has also increased.

On the other hand, according to an increased image quality and a higher frame rate, an image pickup device consumes a larger amount of power and hence generates a larger amount of heat. In general, the performance of the image pickup device is lower as the temperature of the same is higher, and hence it is required to dissipate heat generated by the image pickup device. Also, it is necessary to suppress heat generated by electronic components mounted on the main circuit board from being transferred to the image pickup device, causing a rise of the temperature of the image pickup device. Further, in recent years, due to increased speed of writing in a recording medium, a larger amount of heat is generated by the recording medium.

Conventionally, there has been proposed an image pickup apparatus that is provided, as a measure for dissipating heat from an image pickup device and a main circuit board, with a heat dissipation duct which takes in air from intake ports and discharges the air from exhaust ports, by an air blower, without being communicated with the inside of a housing of the image pickup apparatus (Japanese Laid-Open Patent Publication (Kokai) No. 2013-93697).

According to the proposal, the heat dissipation duct is disposed between a rear surface of the image pickup device opposite to a light receiving surface of the same, and a main circuit board having electronic components mounted thereon. Further, members of the image pickup device are formed of materials each having a higher heat conductivity than members of the main circuit board.

However, in the technique disclosed in Japanese Laid-Open Patent Publication (Kokai) No. 2013-93697, the heat dissipation duct is required to dissipate heat from the main circuit board and heat from the image pickup device. For this reason, a case is envisaged in which the main circuit board generates too large an amount of heat to dissipate all of the heat to the outside, and some of the heat is transferred to the image pickup device, causing a rise in the temperature of the image pickup device.

Further, it is also envisaged that insufficient dissipation of the heat from the main circuit board causes an increase in the temperatures of a recording medium and the like arranged within the housing. According to Japanese Laid-Open Patent Publication (Kokai) No. 2013-93697, however, the heat dissipation duct is required to dissipate the heat from the main circuit board and the heat from the image pickup device, and when the amount of heat generated by the main circuit board increases, it is sometimes impossible for the heat dissipation duct to dissipate all of the heat, causing a problem of rise in the temperatures of the recording medium and the like arranged within the housing.

SUMMARY OF THE INVENTION

The present invention provides an electronic apparatus that is capable of separating and dissipating heat generated by a plurality of heat sources, thereby making it possible to efficiently dissipate the heat generated by the heat sources, and reduce the influence of the heat generated by each heat source on the other heat sources.

Further, the present invention provides an electronic apparatus that is capable of efficiently dissipating heat from a recording medium while separating heat generated by heat sources.

In a first aspect of the present invention, there is provided an electronic apparatus including a plurality of heat sources, comprising a first duct that is disposed between a first heat source and a second heat source, for dissipating heat from the first heat source to an outside, and a second duct that is disposed at a location where the second duct and the first duct sandwich the second heat source, for dissipating heat from the second heat source to the outside.

In a second aspect of the present invention, there is provided an electronic apparatus that includes a plurality of heat sources, comprising a recording medium, a medium substrate as a heat source, a holding member that is electrically and thermally connected to the medium substrate, and includes a flat portion parallel to the medium substrate and the recording medium, for holding the recording medium, and a heat dissipation duct that includes an intake port and an exhaust port, wherein the duct and the flat portion of the holding member are sealed with an elastic member.

In a third aspect of the present invention, there is provided an electronic apparatus that includes a plurality of heat sources and a plurality of ducts, comprising a first duct that dissipates heat from the first heat source to an outside, a second duct that is disposed at a location where the second duct and the first duct sandwich a second heat source, for dissipating heat from the second heat source to the outside, and a third duct that is disposed between the second heat source and the third heat source, for dissipating heat from the third heat source to the outside, wherein the first heat source and the second heat source extend in a vertical direction and are arranged substantially parallel to each other, and the third heat source is disposed at a location in a direction perpendicular to the second heat source, and wherein the second duct and the third duct are connected to the first duct.

According to the present invention, it is possible to provide an electronic apparatus that is capable of separating and dissipating heat generated by a plurality of heat sources, thereby making it possible to efficiently dissipate the heat generated by the heat sources, and reduce the influence of the heat generated by each heat source on the other heat sources.

Further, according to the present invention, it is possible to provide an electronic apparatus that is capable of efficiently dissipating heat from a recording medium while separating heat generated by heat sources.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

Figure 1A:
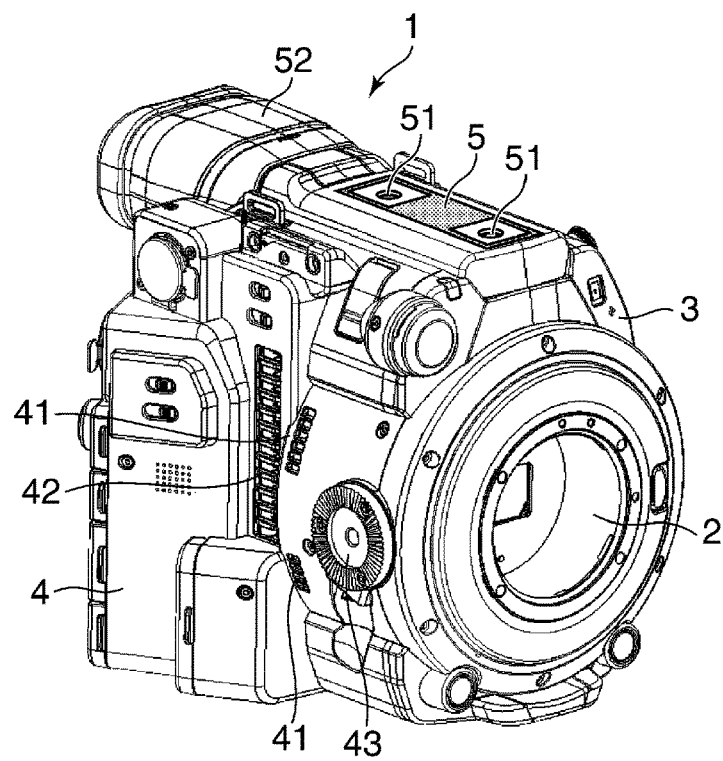
FIG. 1A is a perspective view of a lens-interchangeable digital video camera as an electronic apparatus according to a first embodiment of the present invention, as viewed from the front.
Figure 1B:
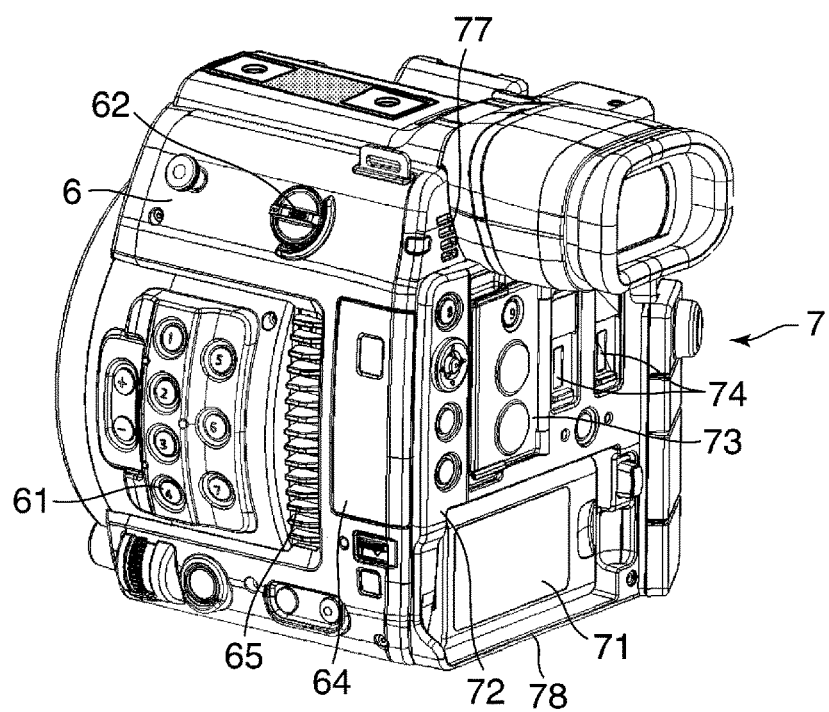
FIG. 1B is a perspective view of the digital video camera shown in FIG. 1A, as viewed from the rear.

FIG. 1A is a perspective view of a lens-interchangeable digital video camera as an electronic apparatus according to a first embodiment of the present invention, as viewed from the front. FIG. 1B is a perspective view of the digital video camera shown in FIG. 1A, as viewed from the rear. Although in the present embodiment, the digital video camera, which is an example of an image pickup apparatus, is described as the electronic apparatus of the present invention, by way of example, this is not limitative.

As shown in FIGS. 1A and 1B, the digital video camera (hereinafter simply referred to as the "camera") of the present embodiment has a camera body 1. On the front side of the camera body 1, there are provided a mount member 2 on which a lens unit, not shown, is removably mounted, and a front cover unit 3 for covering the mount member 2 and so forth. On a left side of the camera body 1, as viewed from the front, there is provided a left side cover unit 4.

The left side cover unit 4 is provided with a second intake port 41 for taking outside air into a first duct unit 82 (see FIG. 2), described hereinafter, and a first intake port 42 for taking outside air into a second duct unit 84 (see FIG. 2), described hereinafter. Further, the left side cover unit 4 is provided with a grip attachment portion 43 to which is removably attached a grip unit, not shown, for a user to hold the camera body 1 when shooting. Arranged on the grip unit are a key for starting/stopping shooting, etc.

On a top of the camera body 1, there is provided a top cover unit 5, and on the top cover unit 5, there are formed two accessory attachment screw portions 51 for attaching a handle, not shown, a display panel, not shown, or the like, to the camera body 1, at respective two locations spaced from each other in an optical axis direction. Further, the top cover unit 5 has a view finder 52 provided on the rear side of the camera body 1.

On a right side of the camera body 1, as viewed from the front, there is disposed a right side cover unit 6. The right side cover unit 6 is provided with right side operation keys 61, a power dial 62, and a first recording medium 63 (see FIG. 2).

The right side operation keys 61 are used for shooting and reproduction, and it is possible to assign functions to the respective right side operation keys 61. Examples of the functions assigned to the keys 61 include start/stop of shooting, peaking, partially enlarging a shooting view angle, changing the filter density of an ND (Neutral Density) unit 80, referred to hereinafter, and changing the rotational speed of an air blower. By turning the power dial 62, it is possible to switch on/off the power supply of the camera body 1. When the camera body 1 is in a power-on state, an object light flux having passed through the lens unit, thereby forming an optical image on an image pickup device 111 (see e.g. FIG. 12A), is photoelectrically converted into image signals by the image pickup device 111. The image signals obtained by photoelectrical conversion of the optical image by the image pickup device 111 are converted to image data by an image processor of a main circuit board 83 (see FIG. 2), described hereinafter, and is displayed as an image on the view finder 52, an external monitor, or the like.

The first recording medium 63 is a main recording medium of the camera, and a first cover member 64 for protecting the first recording medium 63 is provided on the right side cover unit 6 in an openable and closable state. In an open state of the first cover member 64, the first recording medium 63 can be inserted into or removed from the camera body 1. The first recording medium 63 is inserted or removed in a direction substantially perpendicular to the surface of the right side cover unit 6.

Further, in a closed state of the first cover member 64, it is possible to access the first recording medium 63 mounted on the camera body 1, and hence it is possible to record image data of an image picked up by the image pickup device 111 and digitally processed by the image processor of the main circuit board 83. In the present embodiment, the first recording medium 63 is a memory card, such as a CFast (registered trademark) card, and is a recording medium which generates the largest amount of heat out of a plurality of recording media mounted on the camera body 1. Further, the right side cover unit 6 is provided with an exhaust port 65 for discharging air out of the camera body 1 by an air blower 85 (see FIG. 2), described hereinafter. The exhaust port 65 is arranged substantially vertically symmetrical with respect to the optical axis of the camera body 1.

On the rear side of the camera body there is provided a rear cover unit 7, and at a lower portion of the rear cover unit 7, there is provided a battery chamber 78 in which a battery 71 is removably mounted for supplying power to the camera body 1. In an intermediate portion of the rear cover unit 7, there are provided rear operation keys 72, audio operation keys 73 for selecting input voice and setting the level of the volume of the voice, second recording media 74 that can record data, and a second cover member (not shown) for covering the second recording media 74.

Each second recording medium 74 is not only capable of recording data singly, but also capable of recording data simultaneously with recording of the same data by the first recording medium 63. Further, in the present embodiment, the number of the second recording media 74 provided is two, and the same data can be also simultaneously recorded in the two second recording media 74. It is possible to select between the recording media.

Furthermore, in the rear cover unit 7, there are arranged external interfaces, such as a BNC (Bayonet Neill-Concelman) connector for outputting an SDI (Serial Digital Interface) signal, a HDMI (High-Definition Multimedia Interface: registered trademark) connector for video output, a power connector for supplying power, and a headphone connector for voice output, although they are covered by a cover and are not shown in FIGS. 1A and 1B. Further, a third intake port 77 for taking outside air into a third duct unit 86, described hereinafter, is disposed beside the view finder 52.

Figure 2:
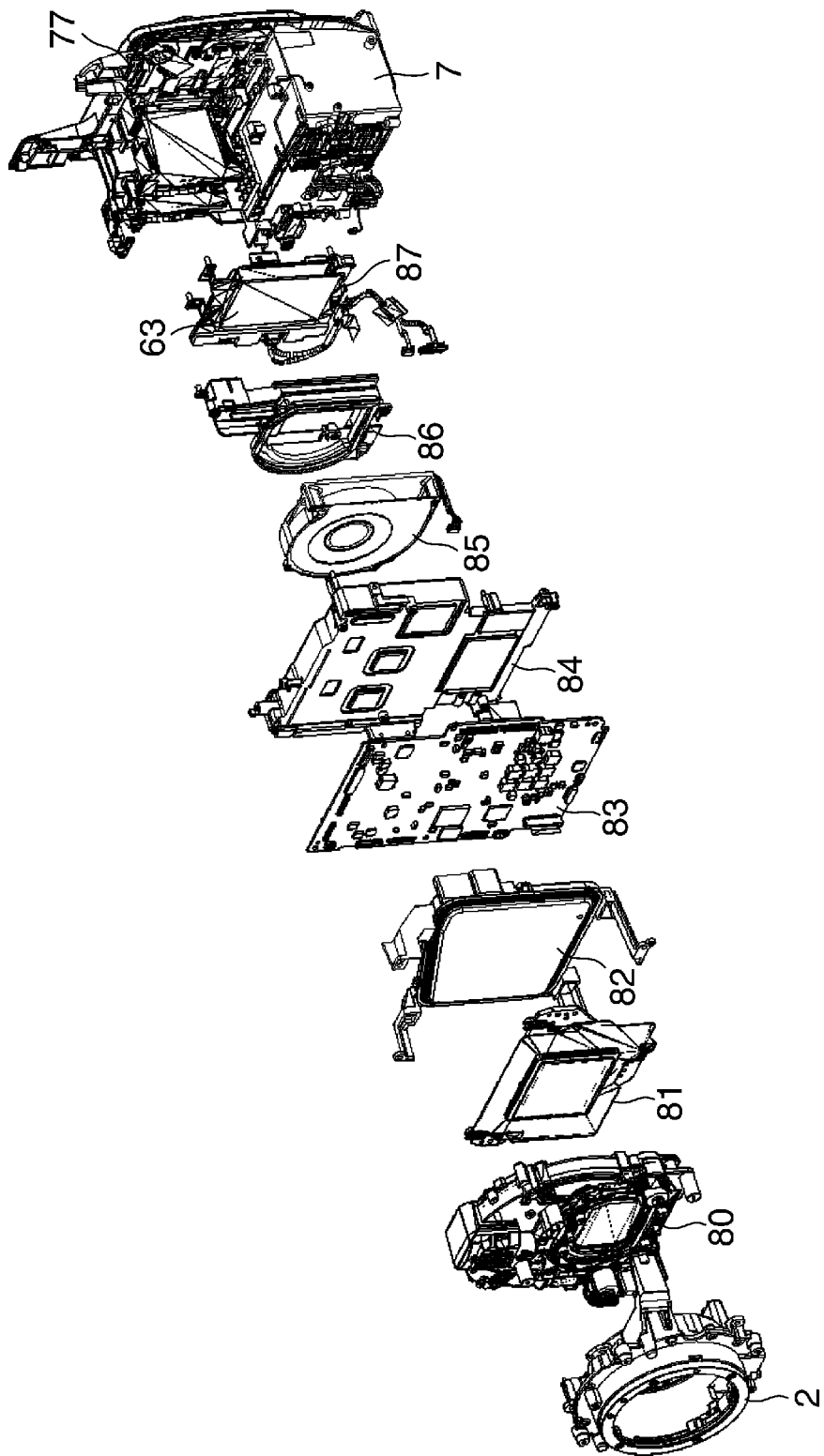
FIG. 2 is an exploded perspective view of a camera body.

Next, the internal structure of the camera body 1 will be described with reference to FIG. 2. FIG. 2 is an exploded perspective view of the camera body 1. In FIG. 2, the cover units 4 to 6 are omitted from illustration.

As shown in FIG. 2, in the camera body 1, the mount member 2 is disposed on the front side of the camera body 1, and the ND unit 80 is disposed on the rear side of the mount member 2. In the present embodiment, the ND unit 80 in use is an electrically driven type, and it is possible to electrically interchange ND filters having a plurality of densities, respectively, by operating the right side operation keys 61.

Figure 12A:
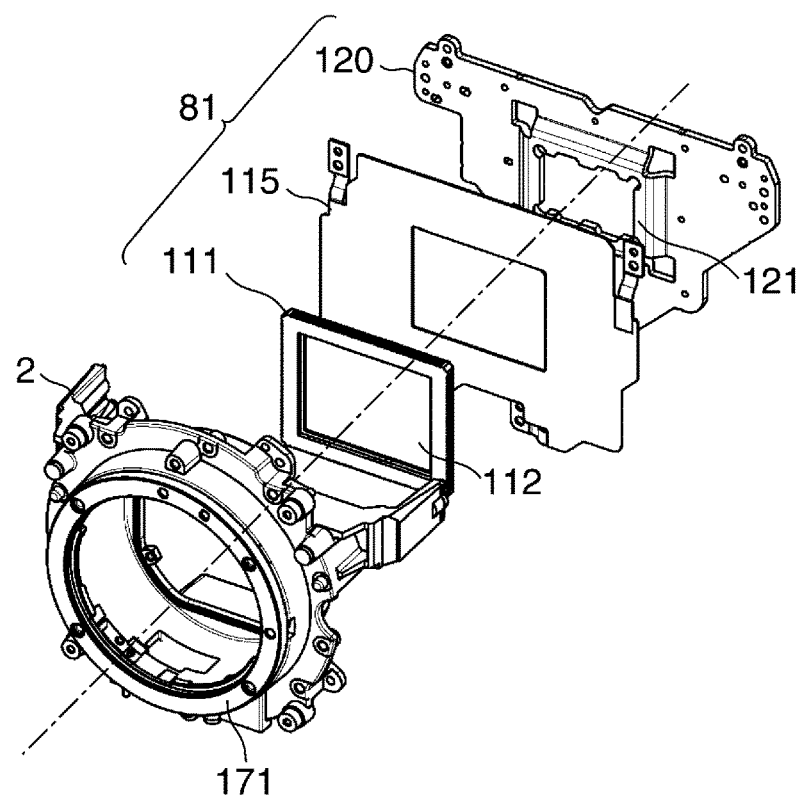
FIG. 12A is an exploded perspective view of a mount member and an image pickup device unit, as viewed from the front of the camera body.

On the rear side of the ND unit 80, there is disposed an image pickup device unit 81 having the image pickup device 111 mounted on a sensor circuit board 115 thereof (see e.g. FIG. 12A). In the present embodiment, the image pickup device unit 81 is a first heat source of the present invention, which generates heat when shooting. On the rear side of the image pickup device unit 81, there is disposed the first duct unit 82. Although detailed description will be given hereinafter, the first duct unit 82 is provided with an ventilation port for connecting the above-mentioned second intake port 41 and exhaust port 65. The image pickup device unit 81 is cooled by transferring heat generated by the image pickup device unit 81 to the first duct unit 82. In the present embodiment, the mount member 2, the ND unit 80, the image pickup device unit 81, and the first duct unit 82 are integrally combined with each other, thereby forming part of the front cover unit 3.

On the rear side of the first duct unit 82, there is disposed the main circuit board 83. The main circuit board 83 controls the camera body 1, and accessories and the like connected to the camera body 1. A plurality of heat sources are provided on the main circuit board 83. In the present embodiment, the main circuit board 83 consumes the largest amount of electric power, and generates the largest amount of heat. In the present embodiment, the main circuit board 83 is a second heat source of the present invention.

On the rear side of the main circuit board 83, there is disposed the second duct unit 84. Although detailed description will be given hereinafter, the second duct unit 84 is provided with a ventilation passage that connects between the above-mentioned first intake port 42 and exhaust port 65. Heat generated by the main circuit board 83 is transferred to the second duct unit 84, whereby the main circuit board 83 is cooled. The air blower 85 is disposed on the rear side of the second duct unit 84. In the present embodiment, a unit formed by integrally combining the main circuit board 83, the second eruct unit 84, and the air blower 85, with each other, is referred to as a main unit.

On the rear side of the air blower 85, there is disposed the third duct unit 86, and on the rear side of the third duct unit 86, there is arranged a recording medium substrate 87. A connector for connecting the first recording medium 63 and the camera body 1 is mounted on the recording medium substrate 87. Although detailed description will be given hereinafter, the third duct unit 86 is provided with a ventilation port that connects between the above-mentioned third intake port 77 and exhaust port 65.

Further, since the first recording medium 63 generates heat when recording data as mentioned above, the heat generated by the first recording medium 63 is transferred to the third duct unit 86, whereby the first recording medium 63 is cooled, and in turn, the recording medium substrate 87 is cooled. In the present embodiment, the recording medium substrate 87 is a third heat source of the present invention. The third duct unit 86 and the recording medium substrate 87 are fixed to the rear cover unit 7, thereby forming part of the rear cover unit 7.

Figure 3:
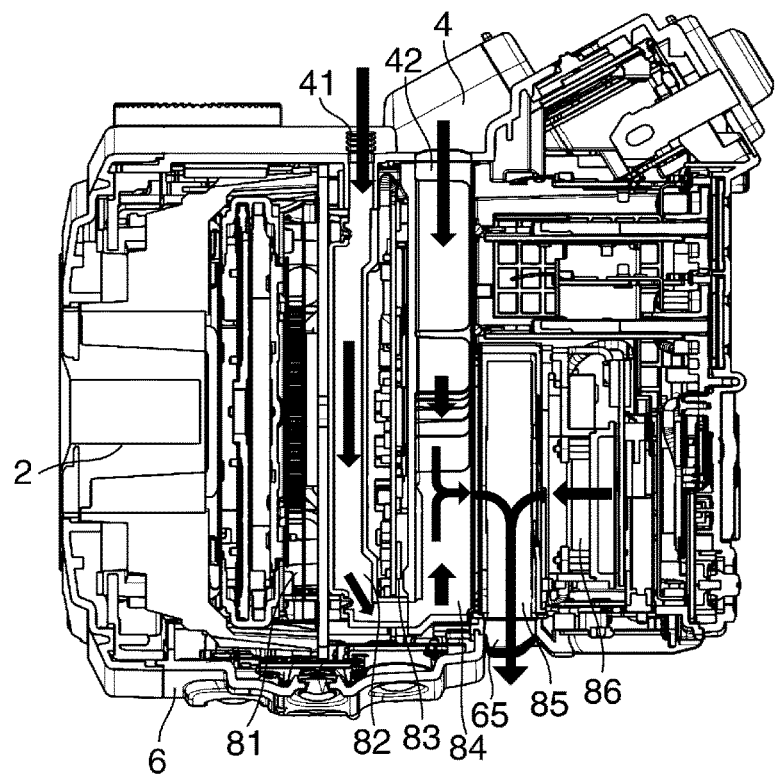
FIG. 3 is a cross-sectional view of the camera body, taken on a horizontal plane passing through a second intake port and parallel to an optical axis.
Figure 4:
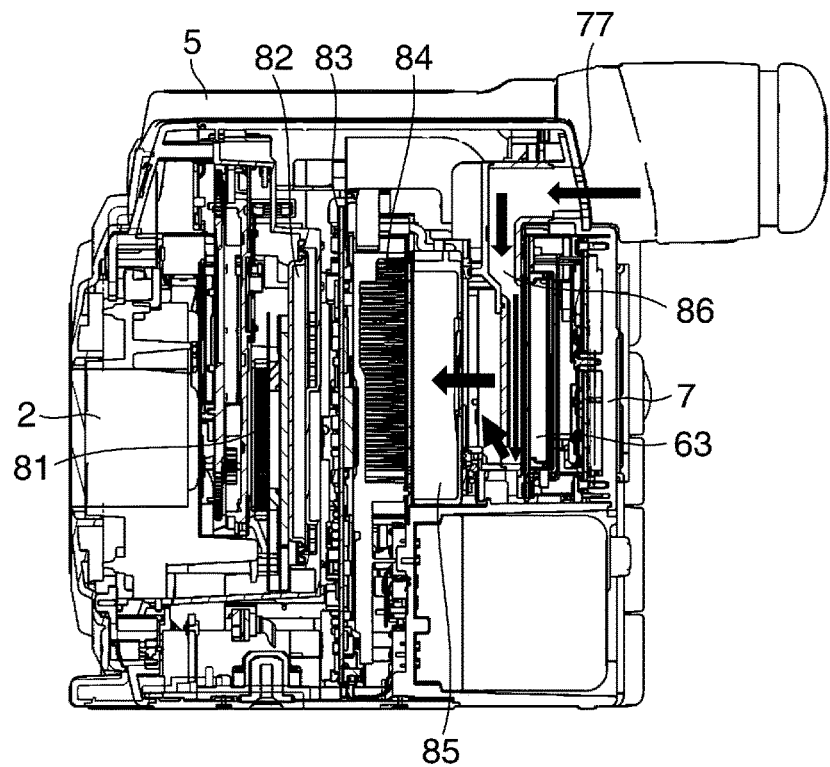
FIG. 4 is a cross-sectional view of the camera body, taken on a vertical plane passing through a third intake port and parallel to the optical axis.

Next, flows of air generated by the air blower 85 will be described with reference to FIGS. 3 and 4. FIG. 3 is a cross-sectional view of the camera body 1, taken on a horizontal plane passing through the second intake port 41 and parallel to the optical axis. FIG. 4 is a cross-sectional view of the camera body 1, taken on a vertical plane passing through the third intake port 77 and parallel to the optical axis. Note that arrows appearing in FIGS. 3 and 4 indicate the flows of air generated by the air blower 85.

As shown in FIG. 3, when the air blower 85 is driven, outside air is taken into the camera body 1 from the first intake port 42, and the taken-in air flows through the second duct unit 84 into the air blower 85. At the same time, outside air is taken into the camera body 1 also from the second intake port 41, and the taken-in air flows through the first duct unit 82 into the air blower 85. Further, at the same time, as shown in FIG. 4, outside air is taken into the camera body 1 also from the third intake port 77, and the taken-in air flows through the third duct unit 86 into the air blower 85. Then, the air taken into the camera body 1 from the three intake ports 42, 41, and 77 is discharged through the exhaust port 65 out of the camera body 1 by the air blower 85.

Here, the image pickup device unit 81, the first duct unit 82, the main circuit board 83, the second duct unit 84, and the recording medium substrate 87 are arranged substantially parallel to each other, such that they are perpendicular to the optical axis. Further, the second intake port 41 and the first intake port 42, and the exhaust port 65 are arranged such that the second intake port 41 and the first intake port 42 are opposed to the exhaust port 65 in the lateral direction of the camera body 1.

Heat from the image pickup device unit 81 (first heat source) is transferred to the first duct unit 82 to be dissipated therefrom, and heat from the main circuit board 83 (second heat source) is transferred to the second duct unit 84 to be dissipated therefrom. Heat from the recording medium substrate 87 (third heat source) is transferred to the third duct unit 86 to be dissipated therefrom.

Further, the first duct unit 82 is arranged between the image pickup device unit 81 (first heat source) and the main circuit board 83 (second heat source), and hence it is possible to prevent heat from being transferred from the main circuit board 83 that generates a larger amount of heat than the image pickup device unit 81, to the image pickup device unit 81. Further, the second duct unit 84 is arranged between the main circuit board 83 (second heat source) and the recording medium substrate 87 (third heat source), and the third duct unit 86 is arranged between the second duct unit 84 and the recording medium substrate 87. For this reason, it is possible to prevent heat from being transferred from the main circuit board 83 that generates a larger amount of heat than the recording medium substrate 87, to the recording medium substrate 87.

As described above, heat generated by the three heat sources 83, 81, and 87 is separated by the three duct units 84, 82, and 86, whereby it is possible to efficiently dissipate the heat generated by the heat sources 83, 81, and 87, thereby making it possible to reduce the influences of the heat from the heat sources 83, 81, and 87 on the other heat sources.

Figure 5:
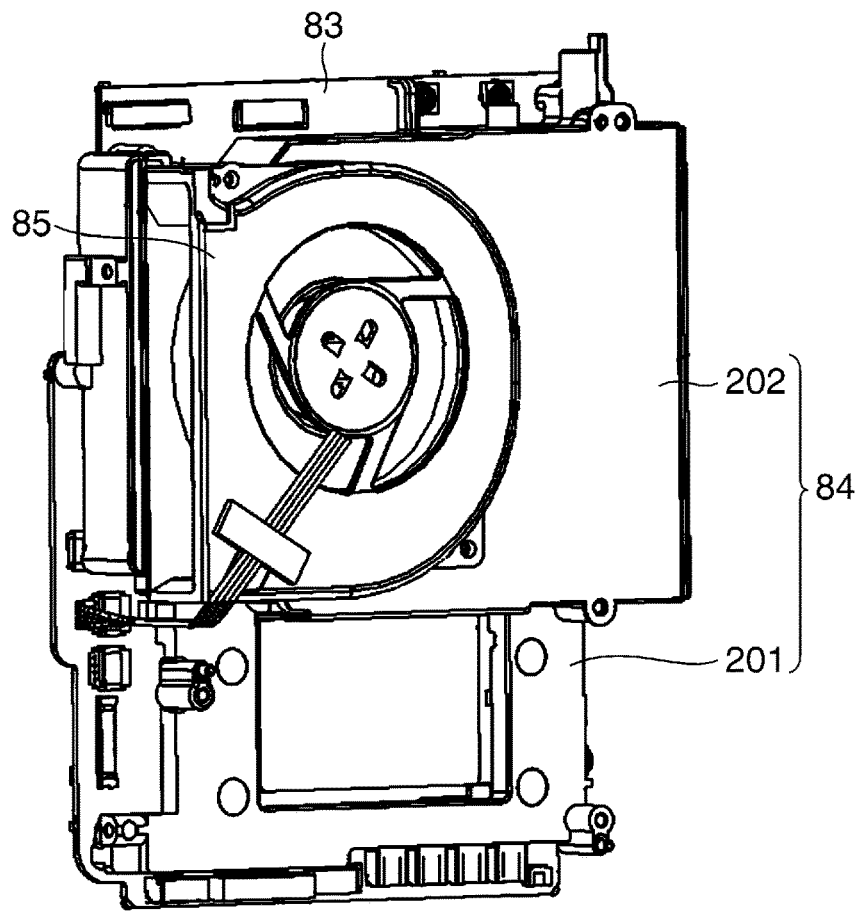
FIG. 5 is a perspective view of a heat dissipating structure of a second duct unit.
Figure 6:
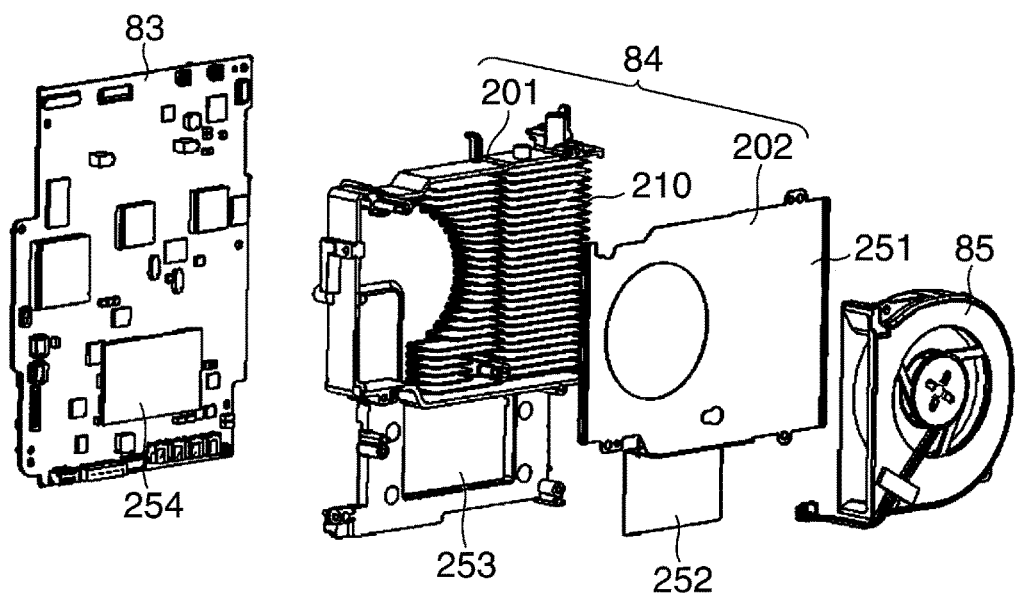
FIG. 6 is an exploded perspective view of a main unit.

Next, the structure of the second duct unit 84 will be described with reference to FIGS. 5 and 6. FIG. 5 is a perspective view of the heat dissipating structure of the second duct unit 84. FIG. 6 is an exploded perspective view of the main unit formed by the main circuit board 83, the second duct unit 84, and the air blower 85.

As shown in FIGS. 5 and 6, the second duct unit 84 includes a second duct 201 and a duct cover 202. The second duct 201 is formed of a metal member having a high heat conductivity or the like. By covering the second duct 201 with the duct cover 202, there is formed a ventilation passage from which no air leaks.

Main devices 220 (see FIGS. 7A and 7B) mounted on the main circuit board 83, and the second duct 201 are disposed in a state overlapped in the optical axis direction such that they are in contact with each other, whereby it is possible to transfer heat from the main devices 220 to the second duct 201 formed of the metal member or the like. Note that a heat dissipation rubber or the like may be interposed between the main devices 220 and the second duct 201 of the main circuit board 83 such that the heat from the main devices 220 can be efficiently transferred to the second duct 201.

As shown in FIG. 6, a large number of fins 210 are erected inside the second duct 201. Although in the present embodiment, the fins 210 are integrally formed with the second duct 201, the fins 210 may be implemented by a heat sink which is formed separately from the second duct 201 and is fixed to the second duct 201. By thus erecting the large number of fins 210, it is possible to increase surface areas where air flowing through the second duct unit 84 touches, and hence the heat is more efficiently transferred to the air for dissipation. In doing this, the flow path of the air flowing through the second duct unit 84 is limited by the second duct 201 and the duct cover 202, whereby it is possible to cause the air to efficiently flow, whereby it possible to increase the heat dissipation effect.

Further, as shown FIGS. 5 and 6, the duct cover 202 forms part of the ventilation passage. The duct cover 202 is provided with a cover portion 251 for forming a side of the ventilation passage, and a heat receiving portion 252 for receiving heat from a lower portion of the main circuit board 83. A duct hole 253 is formed in a lower portion of the second duct 201. A heat dissipation sheet 254 extends through the duct hole 253, whereby the heat receiving portion 252 is brought into contact with the main circuit board 83 via the heat dissipation sheet 254. This makes it possible to transfer heat from a lower portion of a first surface 88 of the main circuit board 83 to the cover portion 251. The heat receiving portion 252 corresponds to an example of a radiator plate of the present invention.

With this, when the second duct unit 84 is cooled, the duct cover 202 is cooled, and further the lower portion of the first surface 88 of the main circuit board 83 is cooled. That is, by forming the ventilation passage only in an upper portion of the main circuit board 83, it is possible to cool the lower portion of the first surface 88 of the main circuit board 83. As a consequence, it is unnecessary to provide a ventilation passage and fins on the lower portion of the second duct 201, and by arranging the battery chamber 78 in an empty spare space, it is possible to reduce the size of the camera body 1.

Figure 7A:
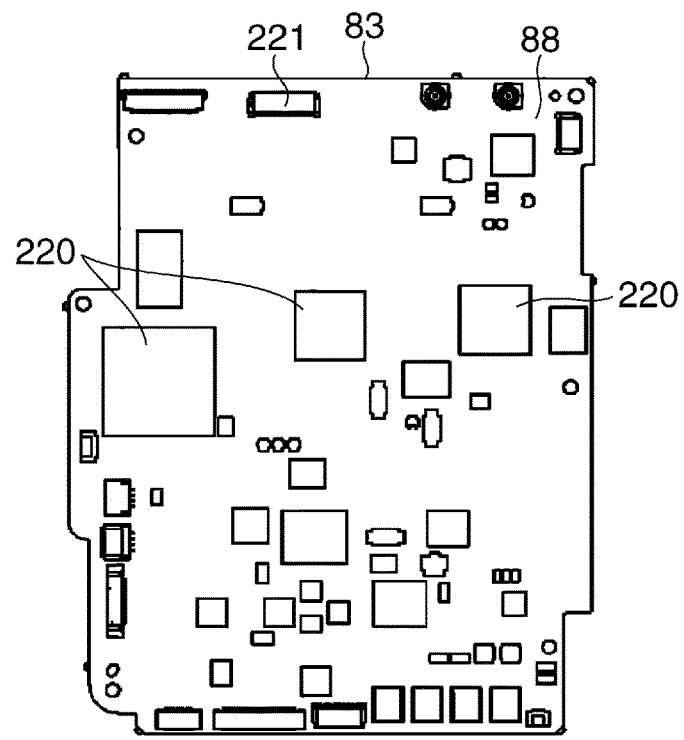
FIG. 7A is a view of a main circuit board, as viewed from the rear of the camera body.

FIG. 7A is a view of the main circuit board 83, as viewed from the rear of the camera body 1. A surface of the main circuit board 83 toward the rear side of the camera body 1 is opposed to the second duct unit 84 in the optical axis direction, and this surface is referred to as the first surface 88.

As shown in FIG. 7A, the main devices 220 which generate relatively large amounts of heat, a connector 221, etc. are mounted on the first surface 88 of the main circuit board 83. The main devices 220 include an image processing IC, a system control IC, and so forth. In recent years, power consumption of a camera has increased according to the improvements of the image quality and the functions of the camera. Accordingly, the main devices 220 mounted on the main circuit board 83 generate much heat so that the temperatures thereof become high. When the temperature of any main device 220, thus made high, exceeds a guaranteed temperature range, it is difficult for the main device 220 to operate normally, which sometimes causes degradation of performance and failure thereof.

Figure 7B:
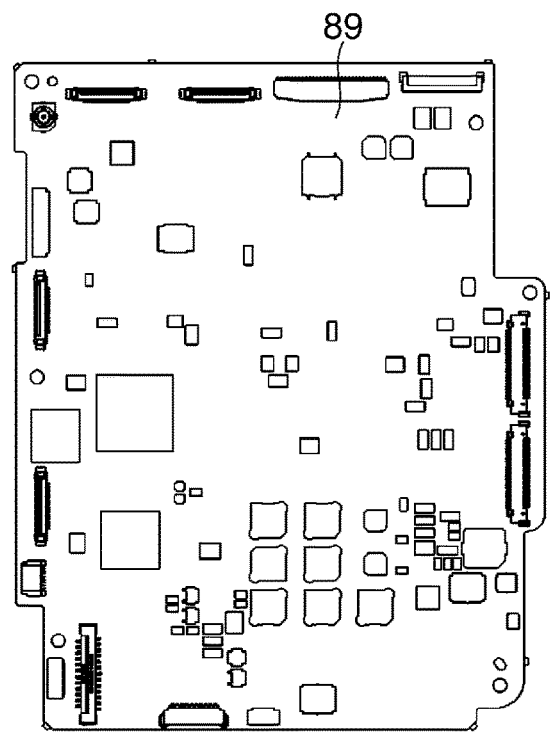
FIG. 7B is a view of the main circuit board, as viewed from the front of the camera body.

FIG. 7B is a view of the main circuit board 83, as viewed from the front of the camera body 1. A surface of the main circuit board 83 toward the front side of the camera body 1 is opposed to the first duct unit 82 in the optical axis direction, and this surface is referred to as a second surface 89. As shown in FIG. 7B, on the second surface 89 of the main circuit board 83, there are mounted electronic components which generate smaller amounts of heat than the main devices 220 mounted on the first surface 88.

Figure 8A:
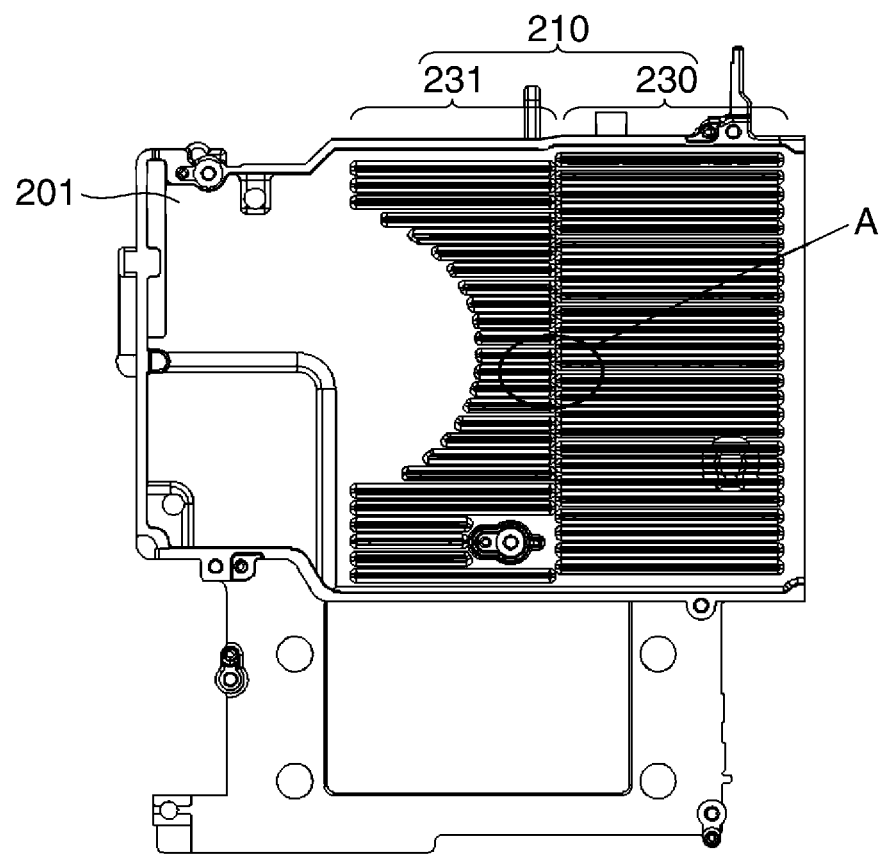
FIG. 8A is a view of a second duct, as viewed from the side of fins.
Figure 8B:
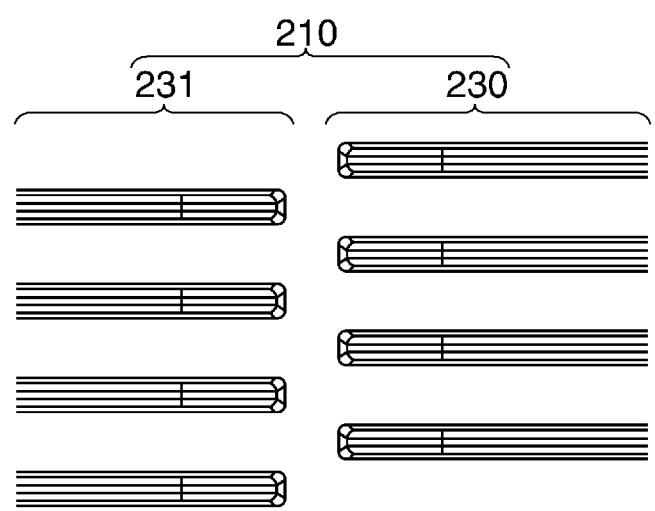
FIG. 8B is an enlarged view of a portion A of FIG. 8A.

FIG. 8A is a view of the second duct 201, as viewed from the side of the fins 210, and FIG. 8B is an enlarged view of a portion A of FIG. 8A. As shown in FIGS. 8A and 8B, the fins 210 are formed by fins in a plurality of columns, including at least fins 230 in a first column and fins 231 in a second column, arranged in the mentioned order from an upstream side (right side, as viewed in FIGS. 8A and 8B) to a downstream side (left side, as viewed in FIGS. 8A and 8B) with respect to the direction of the flow path. The fins 230 in the first column and the fins 231 in the second column are arranged parallel to the direction of the flow path, respectively. This minimizes pressure loss of air flowing through the second duct unit 84, and ensures the flow rate of air required for heat dissipation.

Further, the fins 230 in the first column and the fins 231 in the second column are disposed at intervals of a fixed distance (pitch) in a direction perpendicular to the direction of the flow path. The fins 230 in the first column and the fins 231 in the second column are arranged at the same pitch respectively. Further, the fins 231 in the second column are arranged at positions offset from the fins 230 in the first column by a half pitch in the direction perpendicular to the direction of the flow path.

Figure 9:
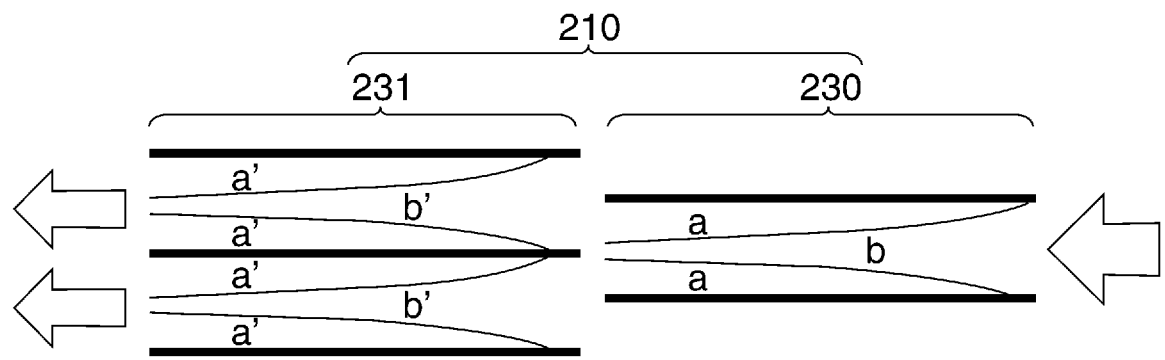
FIG. 9 is a conceptual diagram useful in explaining temperature boundary layers of air flowing between the fins.

FIG. 9 is a conceptual diagram useful in explaining temperature boundary layers of air flowing between the fins 210. As described above, air flows between the fins 210 of the second duct unit 84 in the direction of the flow path. First, when air flows between the fins 230 in the first column, heat is transferred from the fins 230 to the air, so that a layer of the warmed air is formed such that it becomes progressively thicker toward the downstream side, as shown in regions indicated by "a". Air which is relatively unwarmed flows through a region indicated by "b" between the fins 230 in the first column.

Next, the air flows between the fins 231 in the second column. At this time, the unwarmed air from the region b touches upstream-side ends of the fins 231 in the second column, which are arranged at the positions offset by the half pitch from the fins 230 in the first column. As a consequence, the fins 231 in the second column, which are erected downstream of the fins 210, can also touch the air which is relatively unwarmed, whereby it is possible to promote heat transfer to the air. Further, since the air hits against the upstream-side ends of the fins 231 in the second column, the flows of the air are made turbulent at the upstream-side ends of the fins 231.

The heat transfer coefficient of the turbulent air flow is higher than that of a laminar air flow, and hence the heat dissipation effect is increased by the turbulent air flow. Therefore, according to the structure of fins of the present embodiment, the amount of heat dissipation on the downstream side is increased because of the use of cool air (relatively unwarmed air) and the effect of air turbulence, which results in improvement of the entire heat dissipation performance.

Figure 10:
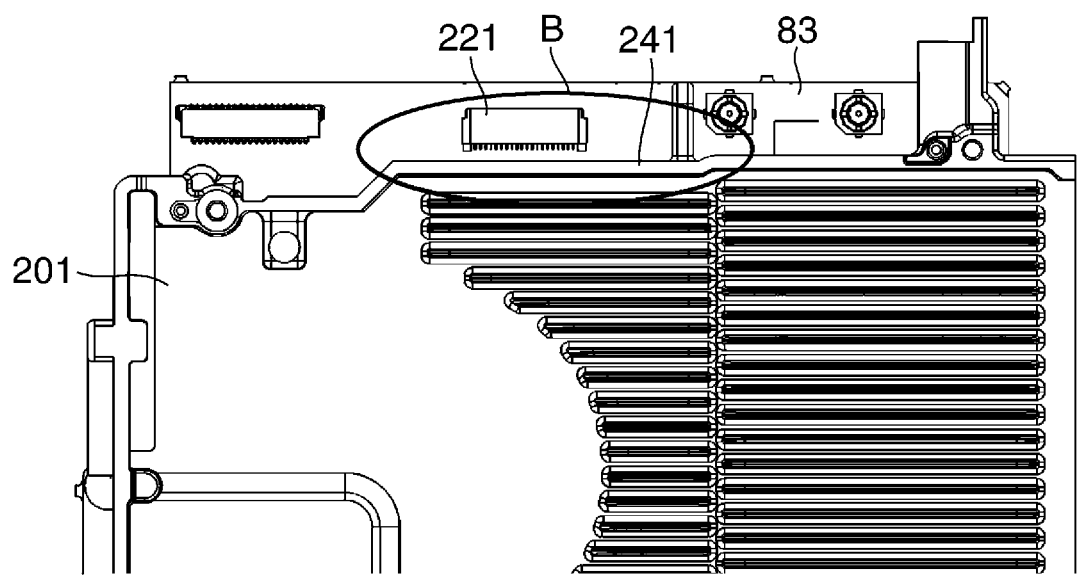
FIG. 10 is a partial enlarged view of the main circuit board and the second duct.

FIG. 10 is a partial enlarged view of the main circuit board 83 and the second duct 201. In the second duct unit 84, air uniformly touches all of the fins 210, whereby it is possible to stably transfer heat from the fins 210 to the air. To this end, as described above, the fins 210 in plurality are arranged side by side at a predetermined pitch. With this, cross-sectional areas of all the flow paths between the fins can be made substantially uniform, whereby a flow rate distribution is made uniform and air reaches all the fins.

In the present embodiment, the fins 210 are formed by the fins 230 in the first column and the fins 231 in the second column, and as described hereinabove, the fins 230 in the first column and the fins 231 in the second column are offset by the half pitch. That is, the fins 231 in the second column are arranged to be displaced downward from the fins 230 in the first column by the half pitch.

Therefore, as shown in FIG. 10, at a location above the fins 231 in the second column displaced downward by a half pitch, a cutout portion 241 is formed in an outer shape portion of a top side of the second duct 201 according to the amount of the displacement, such that the cross-sectional areas of flow paths in the second duct 201 are made uniform. With this, it is also possible to make uniform the cross-sectional areas of the flow paths even in the arrangement of the fins 210 offset by the half pitch as in the present embodiment, whereby it is possible to enhance the heat dissipation performance.

Further, the cutting out of part of the second eruct 201 also contributes to reduction of the size and weight of the second duct 201 formed of the metal member having a high specific gravity. Furthermore, it is possible to arrange the connector 221 of the main circuit board 83 in a space (region B) in the optical axis direction, formed along the cutout portion 241 of the second duct 201. This makes it possible to reduce the size of the main circuit board 83, and in turn reduce the size of the camera body 1.

Figure 11:
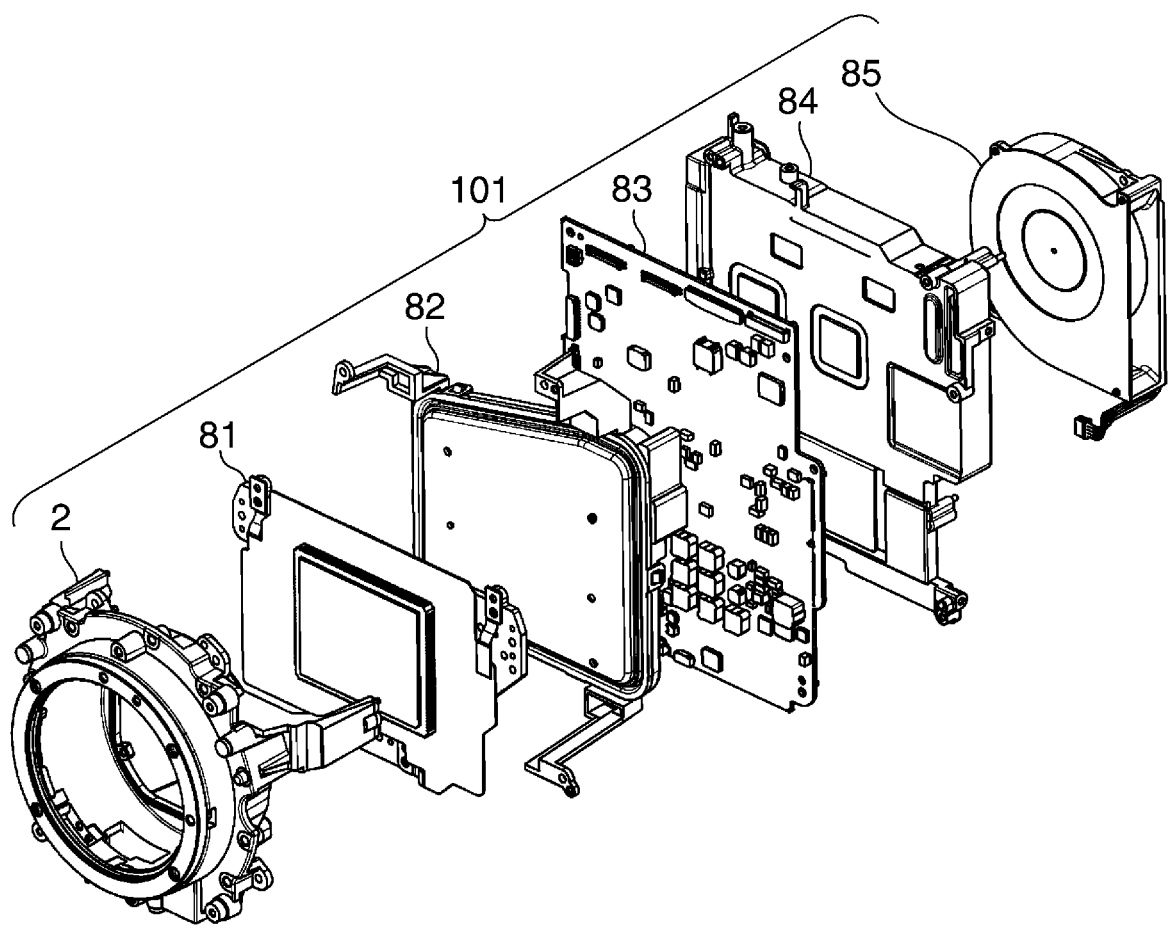
FIG. 11 is an exploded perspective view of a heat dissipation unit of the camera body, as viewed from the front of the camera body.

FIG. 11 is an exploded perspective view of a heat dissipation unit 101 of the camera body 1, as viewed from the front of the camera body 1. As shown in FIG. 11, the heat dissipation unit 101 of the camera body 1 includes the mount member 2, the image pickup device unit 81, the first duct unit 82, the main Circuit board 83, the second duct unit 84, and the air blower 85. Note that in FIG. 11, the ND unit 80 is omitted from illustration.

Figure 12B:
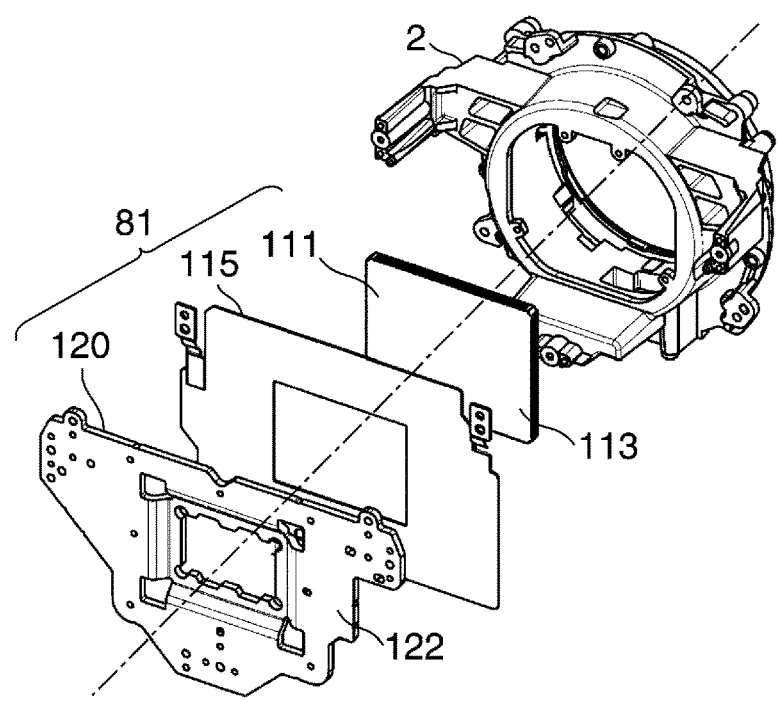
FIG. 12B is an exploded perspective view of the mount member and the image pickup device unit shown in FIG. 12A, as viewed from the rear of the camera body.

FIG. 12A is an exploded perspective view of the mount member 2 and the image pickup device unit 81, as viewed from the front of the camera body 1. FIG. 12B is an exploded perspective view of the mount member 2 and the image pickup device unit 81 shown in FIG. 12A, as viewed from the rear of the camera body 1.

As shown in FIGS. 12A and 12B, the image pickup device unit 81 includes the image pickup device 111, the sensor circuit board 115 on which the image pickup device 111 is mounted, and a device fixing member 120 to which the sensor circuit board 115 is fixed. A surface of the image pickup device 111 toward the front side of the camera body 1 is referred to as an image pickup surface 112, and a surface of the same toward the rear side of the camera body 1 is referred to as a heat conductive surface 113. A surface of the device fixing member 120 toward the front side of the camera body 1 is referred to as a device bonding surface 121, and a surface of the same toward the rear side of the camera body 1 is referred to as a heat conductive surface 122. The heat conductive surface 113 of the image pickup device 111 is bonded to the device bonding surface 121. This causes heat generated by the image pickup device 111 to be transferred to the device fixing member 120 via the device bonding surface 121.

The mount member 2 has a lens mount surface 171 formed at an end thereof toward the front side of the camera body 1, for having the lens unit removably mounted thereon, and has the device fixing member 120 fixed to an end thereof toward the rear side of the camera body 1. The mount member 2 is fixed to the front cover unit 3 of the camera body 1.

Figure 13A:
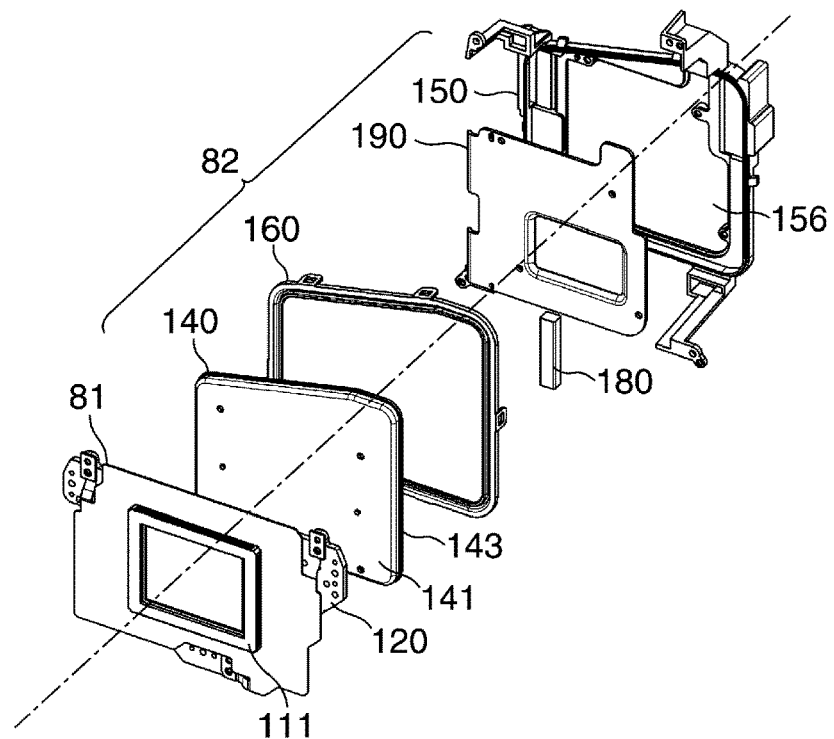
FIG. 13A is an exploded perspective view of an image pickup device unit and a first duct unit, as viewed from the front of the camera body.
Figure 13B:
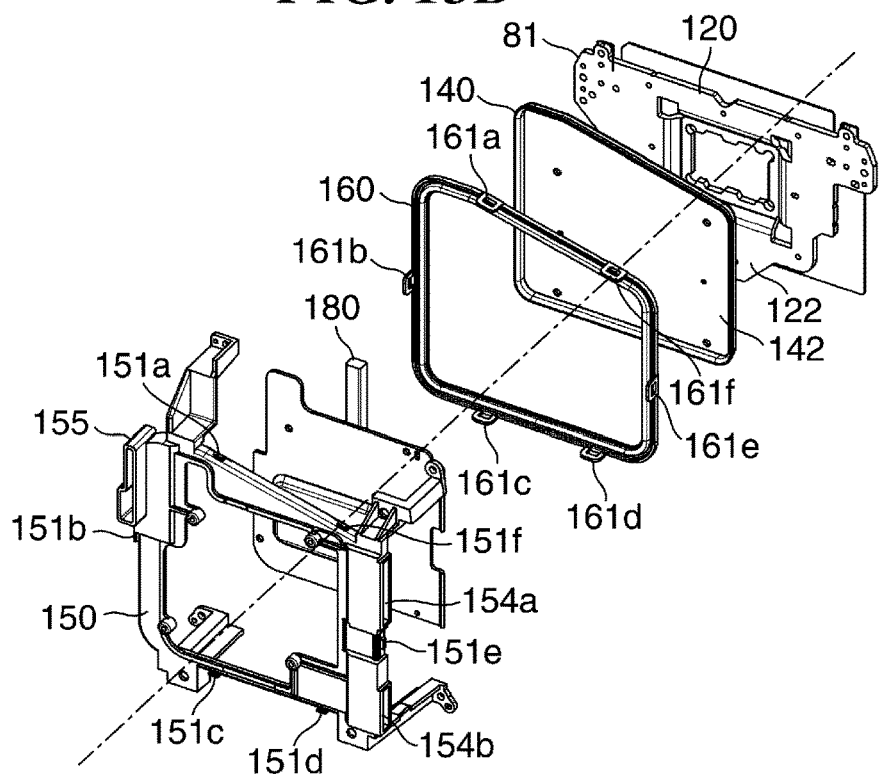
FIG. 13B is an exploded perspective view of the image pickup device unit and the first duct unit shown in FIG. 13A, as viewed from the rear of the camera body.
Figure 14:
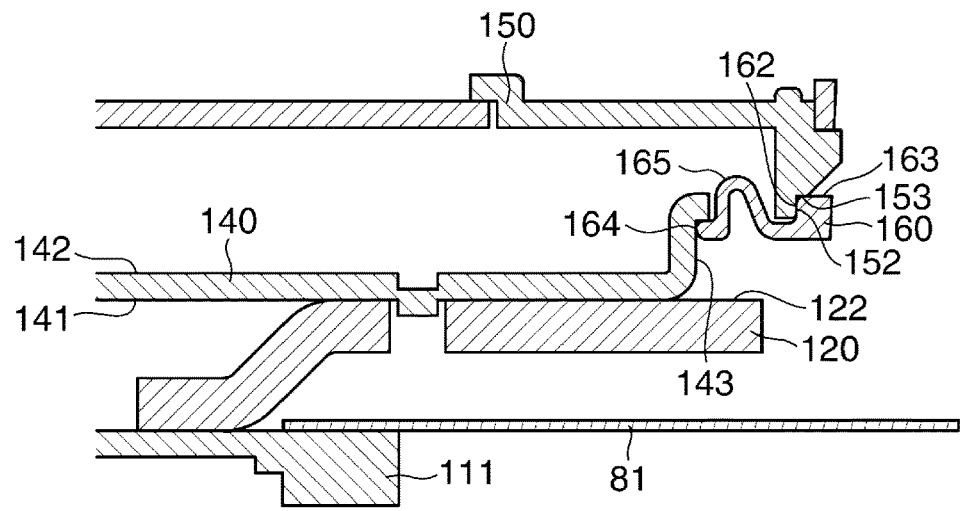
FIG. 14 is a cross-sectional view of essential parts of an assembly of the image pickup device unit and the first duct unit.

FIG. 13A is an exploded perspective view of the image pickup device unit 81 and the first duct unit 82, as viewed from the front of the camera body 1, and FIG. 13B is an exploded perspective view of the image pickup device unit 81 and the first duct unit 82 shown in FIG. 13A, as viewed from the rear of the camera body 1. FIG. 14 is a cross-sectional view of essential parts of an assembly of the image pickup device unit 81 and the first duct unit 82.

As shown in FIGS. 13A and 13B, the first duct unit 82 includes a device heat dissipation member 140, a holding member 150, an elastic member 160, a heat dissipation member 190, and an electrically conductive member 180.

The device heat dissipation member 140 has a heat conductive surface 141, a heat transfer surface 142, and a contact surface 143.

The heat conductive surface 141 is a surface of the device heat dissipation member 140 toward the front side of the camera body 1, and is brought into contact with the heat conductive surface 122 of the device fixing member 120 and fixed thereto. With this, the heat transferred from the image pickup device 111 to the device fixing member 120 is transferred to the device heat dissipation member 140 via the heat conductive surface 141. The heat transfer surface 142 is a surface of the device heat dissipation member 140 toward the rear side of the camera body 1, and the contact surface 143 is protrudingly formed along the entire circumference of an outer peripheral portion of the device heat dissipation member 140.

Figure 16:
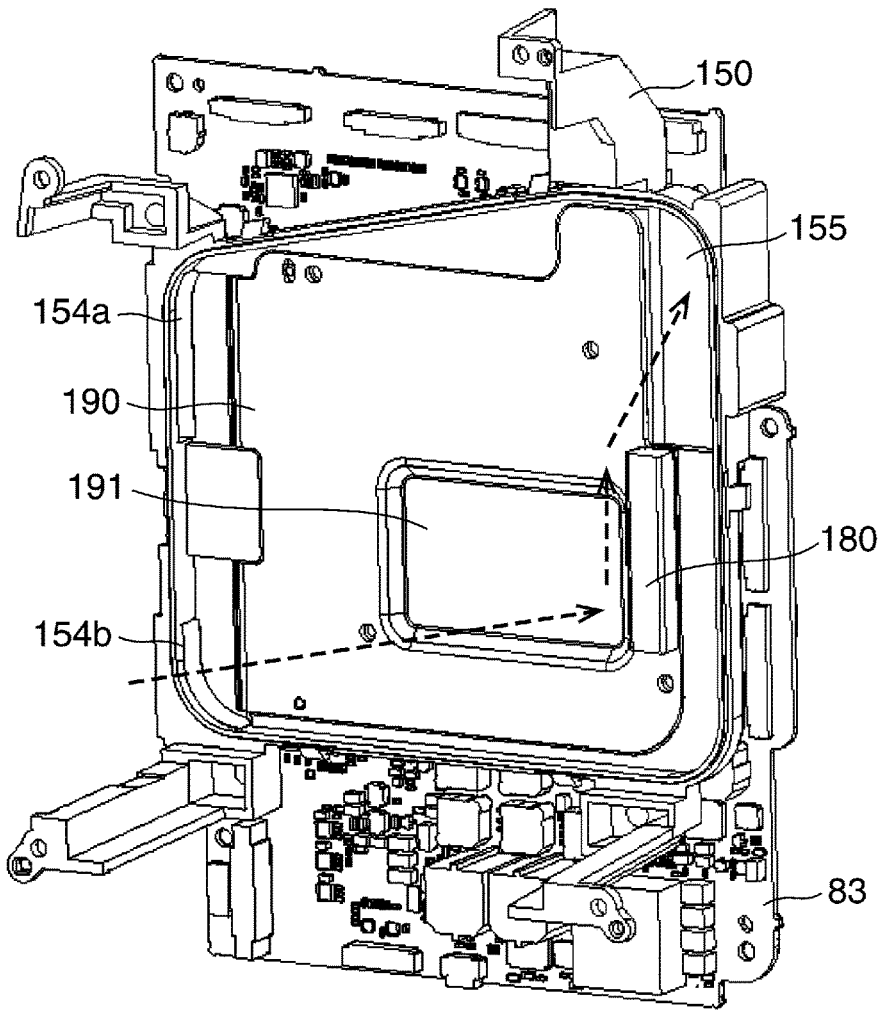
FIG. 16 is a perspective view of a holding member, a heat dissipation member, and an electrically conductive member of the first duct unit, and the main circuit board.

As shown in FIGS. 13B and 14, the holding member 150 includes lug portions 151a to 151f, a first contact surface 152, a second contact surface 153, an intake port 154a, an intake port 154b, and an exhaust port 155 (see FIG. 16). The holding member 150 is fixed to the camera body 1. The lug portions 151a to 151f are erected at spaced intervals along the entire circumference of the holding member 150. The first contact surface 152 is formed along the entire circumference of the holding member 150 such that it extends in parallel with the optical axis. The second contact surface 153 is formed along the entire circumference of the holding member 150 such that it extends perpendicular to the optical axis.

The intake ports 154a and 154b are openings for sending air into the first duct unit 82. They are formed in a manner associated with the second intake port 41 of the left side cover unit 4, and are in contact with the left side cover unit 4. The exhaust port 155 is an opening for sending out air from the first duct unit 82, and is in communication with the second duct unit 84.

The elastic member 160 includes lug engaging portions 161a to 161f, a first contact portion 162, a second contact portion 163, a third contact portion 164, and a bent portion 165. The lug engaging portions 161a to 161f are erected at spaced intervals along the entire circumference of the elastic member 160, and are engaged with the lug portions 151a to 151f of the holding member 150.

The first contact portion 162 is brought into pressure contact with the first contact surface 152 of the holding member 150, and the second contact portion 163 is brought into pressure contact with the second contact surface 153 of the holding member 150. The third contact portion 164 is brought into contact with the contact surface 143 of the device heat dissipation member 140. The bent portion 165 extends between the first contact portion 162 and the third contact portion 164. Therefore, the elastic member 160 is brought into pressure contact with the holding member 150 in the optical axis direction and a direction toward the center of the optical axis (in a radially inward direction). However, the elastic member 160 is movable in the optical axis direction since it is only in contact with the device heat dissipation member 140 in the direction toward the center of the optical axis.

Figure 15:
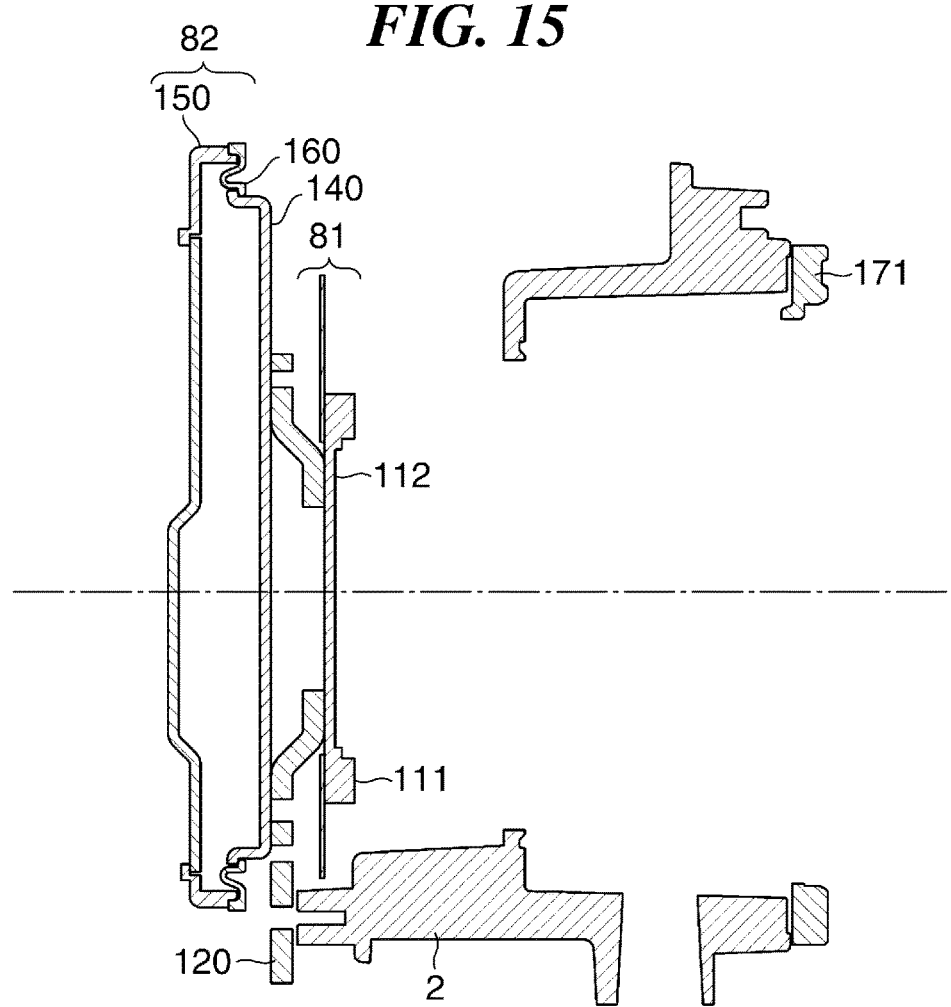
FIG. 15 is a cross-sectional view of essential parts of the mount member, the image pickup device unit, and the first duct unit, taken along an optical axis direction.

FIG. 15 is a cross-sectional view of essential parts of the mount member 2, the image pickup device unit 81, and the first duct unit 82, in the optical axis direction. Referring to FIG. 15, the distance from the lens mount surface 171 to the image pickup surface 112 in the optical axis direction is referred to as the flange back length. In case that the flange back length changes, the image pickup surface 112 of the image pickup device 111 also changes, which makes it impossible to shoot a video as intended by the user. In the present embodiment, to suppress the change in the flange back length, the elastic member 160 is interposed between the device heat dissipation member 140 and the holding member 150.

The holding member 150, which includes the intake ports 154a and 154b in contact with the left side cover unit 4, and the device heat dissipation member 140, which is fixed to the front cover unit 3 via the mount member 2 and the image pickup device unit 81, are different in the method of fixation to the camera body 1. For this reason, when impact is applied to the camera body 1, the holding member 150 and the device heat dissipation member 140 show different behaviors.

For example, in a case where the holding member 150 moves with respect to the device heat dissipation member 140 in a direction perpendicular to the optical axis, the bent portion 165 of the elastic member 160 is elastically deformed, whereby it is possible to prevent impact from being applied to the device heat dissipation member 140. Further, in a case where the holding member 150 moves with respect to the device heat dissipation member 140 in the optical axis direction, the third contact portion 164 of the elastic member 160 slides in the optical axis direction, whereby it is possible to prevent impact from being applied to the device heat dissipation member 140.

Therefore, even when the holding member 150 and the device heat dissipation member 140 show different behaviors, it is possible to prevent impact from being applied to the device heat dissipation member 140. This makes it possible to provide a highly reliable camera that is capable of suppressing a change in the flange back length even when impact is applied to the camera.

Note that to check whether or not the elastic member 160 is normally incorporated, it is desirable that the holding member 150 is made of an optically transparent material. However, if an optically transparent material is used, when the user views the holding member 150 from the outside of the camera body 1, the inside of the camera body 1 is seen through the holding member 150, which spoils the quality of the camera, and hence it is desirable that the holding member 150 is made of a material with reduced optical transparency. Therefore, to improve the workability of assembly work and also to prevent degradation of the quality of the camera body 1, it is desirable that the holding member 150 is made of a translucent material.

Figure 17:
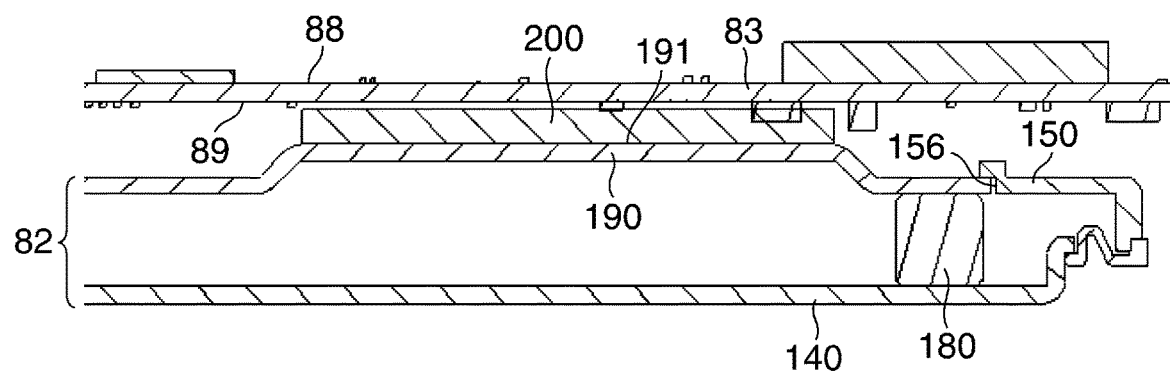
FIG. 17 is a cross-sectional view of essential parts of an assembly of a device heat dissipation member, the electrically conductive member, the holding member, the heat dissipation member, a heat dissipation sheet of the first duct unit, and the main circuit board.

FIG. 16 is a perspective view of the holding member 150, the heat dissipation member 190, and the electrically conductive member 180 of the first duct unit 82, and the main circuit board 83. FIG. 17 is a cross-sectional view of essential parts of an assembly of the device heat dissipation member 140, the electrically conductive member 180, the holding member 150, the heat dissipation member 190, a heat dissipation sheet 200 of the first duct unit 82, and the main circuit board 83.

As shown in FIGS. 16 and 17, the device heat dissipation member 140, the electrically conductive member 180, the holding member 150, the heat dissipation member 190, the heat dissipation sheet 200, and the main circuit board 83 are arranged in the mentioned order from the front side toward the rear side of the camera body 1. The heat dissipation member 190 of the first duct unit 82 is provided with a raised portion 191 that is raised toward the rear side of the camera body 1. The heat dissipation member 190 is fixed to the holding member 150. The electrically conductive member 180 is in contact with the heat dissipation member 190 and the device heat dissipation member 140 to electrically connect the two members 190 and 140.

The holding member 150 is formed with an opening 156 (see FIG. 13A). The heat dissipation member 190 is exposed from the opening 156 toward the rear side of the camera body 1. Further, the heat dissipation member 190 is formed of a metal member having a high heat conductivity, and the holding member 150 is formed e.g. of a plastic member having a lower heat conductivity than that of the metal member of the heat dissipation member 190.

Here, a description will be given of the flow path of air flowing through the heat dissipation unit 101 of the camera body 1. The air blower 85 causes the air within the second duct unit 84 and the first duct unit 82 to flow. Outside air taken in from the first intake port 42 passes through the second eruct unit 84, and is sucked into the air blower 85, whereafter the air is discharged from the exhaust port 65. At the same time, outside air taken in from the intake ports 154a and 154b passes through the first duct unit 82 and then through the exhaust port 155, and is sucked into the air blower 85, whereafter the air is discharged from the exhaust port 65.

At this time, to make it easy for the outside air taken in from the intake ports 154a and 154b, to flow through the first duct unit 82 to the exhaust port 155, a flow path (indicated by broken line arrows in FIG. 16) is formed within the first duct unit 82 by arranging the electrically conductive member 180. This causes the electrically conductive member 180 to form the flow path within the first duct unit 82 while electrically connecting the heat dissipation member 190 and the device heat dissipation member 140 of the first duct unit 82.

As described above, in the present embodiment, air within the two duct units, i.e. the second duct unit 84 and the first duct unit 82 is caused to flow by the blower 85. This makes it possible to dispense with a plurality of blowers, to thereby reduce the size of the camera body 1.

Next, a description will be given of a heat transfer path of the heat dissipation unit 101 of the camera body 1. As described hereinabove, the heat from the main circuit board 83 is transferred to the fins 210 of the second duct unit 84. Heat from the image pickup device 111 of the image pickup device unit 81 is transferred to the heat transfer surface 142 of the first duct unit 82. The main circuit board 83 and the sensor circuit board 115 are connected via a plurality of members and hence have a structure in which heat transfer therebetween by heat conduction is suppressed.

Outside air taken in from the intake ports 154a and 154b of the first duct unit 82 passes the heat transfer surface 142 of the device heat dissipation member 140, whereby the heat transfer surface 142 is cooled by heat transfer to the air. This also cools the heat conductive surface 122 of the device fixing member 120, which is in contact with the heat conductive surface 141 of the device heat dissipation member 140. Further, the heat conductive surface 113 of the image pickup device 111, which is in contact with the device bonding surface 121 of the device fixing member 120, is cooled. The image pickup device 111 is cooled by heat transfer through the heat transfer path configured as above.

Next, a description will be given of a heat transfer path of the main circuit board 83. As described above, the main devices 220 with high power consumption are arranged on the first surface 88 of the main circuit board 83 and heat from the main devices 220 is transferred to the second duct 201, for dissipation. On the other hand, although no devices with high power consumption are arranged on the second surface 89 of the main circuit board 83, it is required to dissipate heat therefrom since the second surface 89 is affected by the main devices 220 with high power consumption, which are arranged on the first surface 88.

To meet this requirement, heat of the second surface 89 of the main circuit board 83 is transferred to the heat dissipation member 190 via the heat dissipation sheet 200. Then, heat is transferred from the heat dissipation member 190 to air flowing through the first duct unit 82, whereby the devices arranged on the second surface 89 of the main circuit board 83 toward the image pickup device 111 are cooled.

That is, the heat from the image pickup device 111 is transferred to air flowing through the first duct unit 82 via the device heat dissipation member 140, and heat from the devices on the second surface 89 of the main circuit board 83 toward the image pickup device 111 is transferred to the air flowing through the first duct unit 82 via the heat dissipation member 190. At this time, the device heat dissipation member 140 and the heat dissipation member 190 are connected via the holding member 150 having a lower heat conductivity. This makes it possible for the first duct unit 82 to cool the image pickup device 111 without receiving the heat from the main circuit board 83.

Next, with reference to FIGS. 18A to 21, a description will be given of the heat dissipation structure of the first recording medium 63 (hereinafter referred to as the "medium 63") and the recording medium substrate 87 (hereinafter referred to as the "medium substrate 87"), which uses the air blower 85. Note that in FIGS. 18A to 21, the vertical direction of the camera body 1, the optical axis direction, and the lateral direction of the camera body 1 are referred to as "the Y direction", "the Z direction", and "the X direction", respectively. Further, the top side and the front side of the camera body 1, and the left side (side toward the first intake port 42), as viewed from the front of the camera body 1 are referred to as "the +Y side", "the +Z side", and "the −X side", respectively.

Figure 18A:
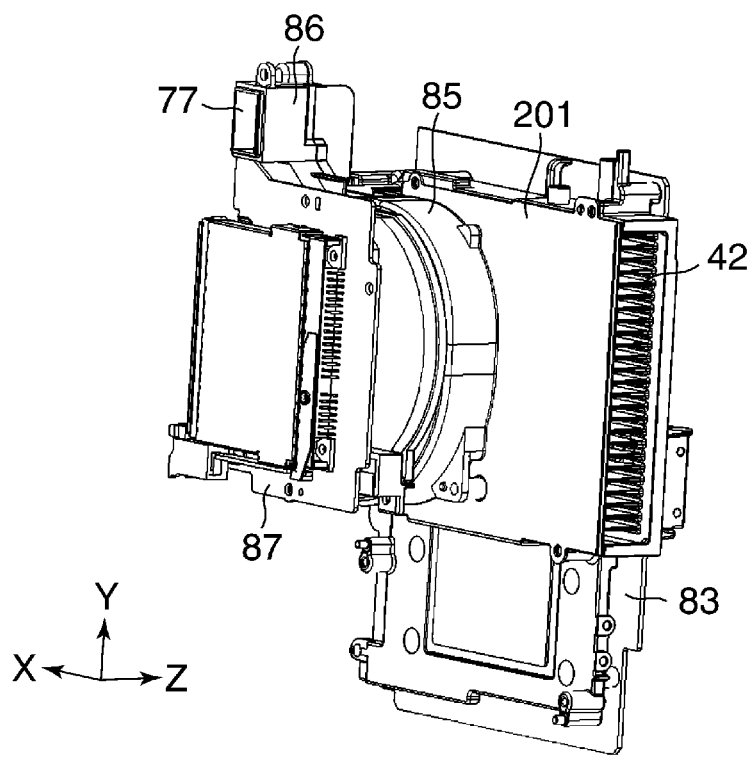
FIG. 18A is a perspective view of a cooling unit, as viewed from the rear of the camera body.
Figure 18B:
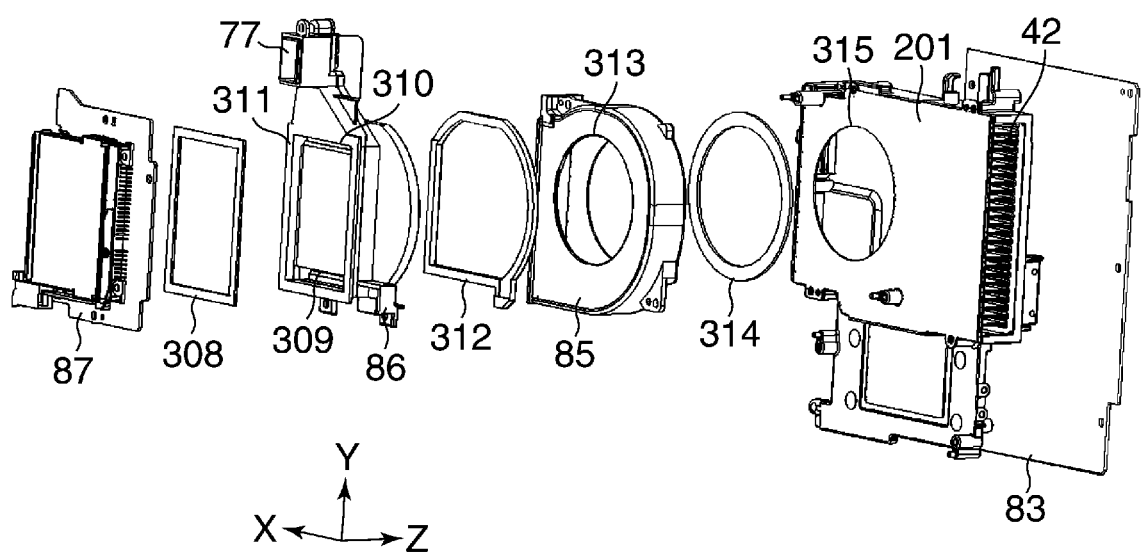
FIG. 18B is an exploded perspective view of the cooling unit shown in FIG. 18A.
Figure 19A:
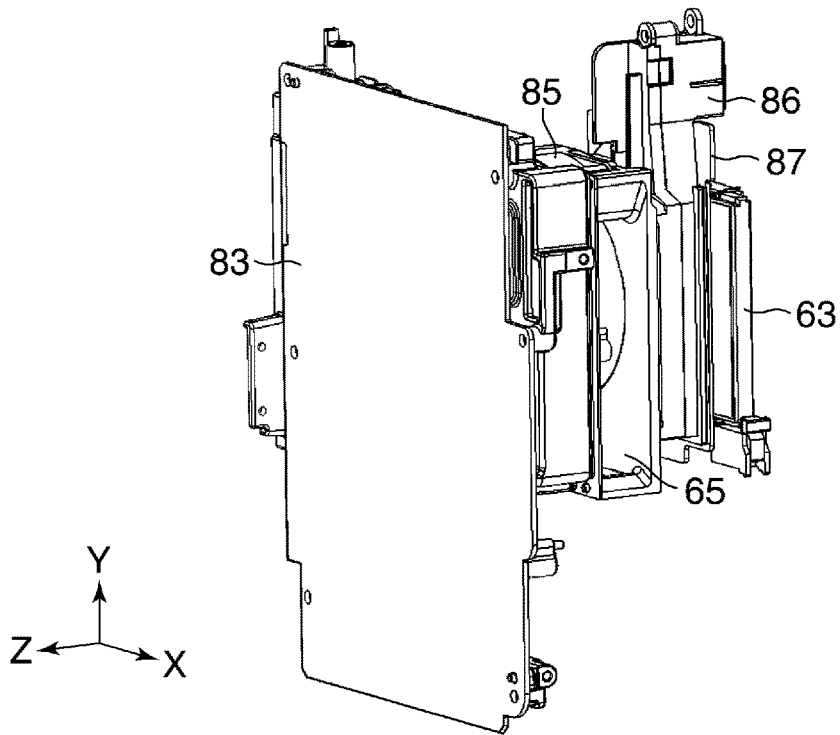
FIG. 19A is a perspective view of the cooling unit, as viewed from the front of the camera body.
Figure 19B:
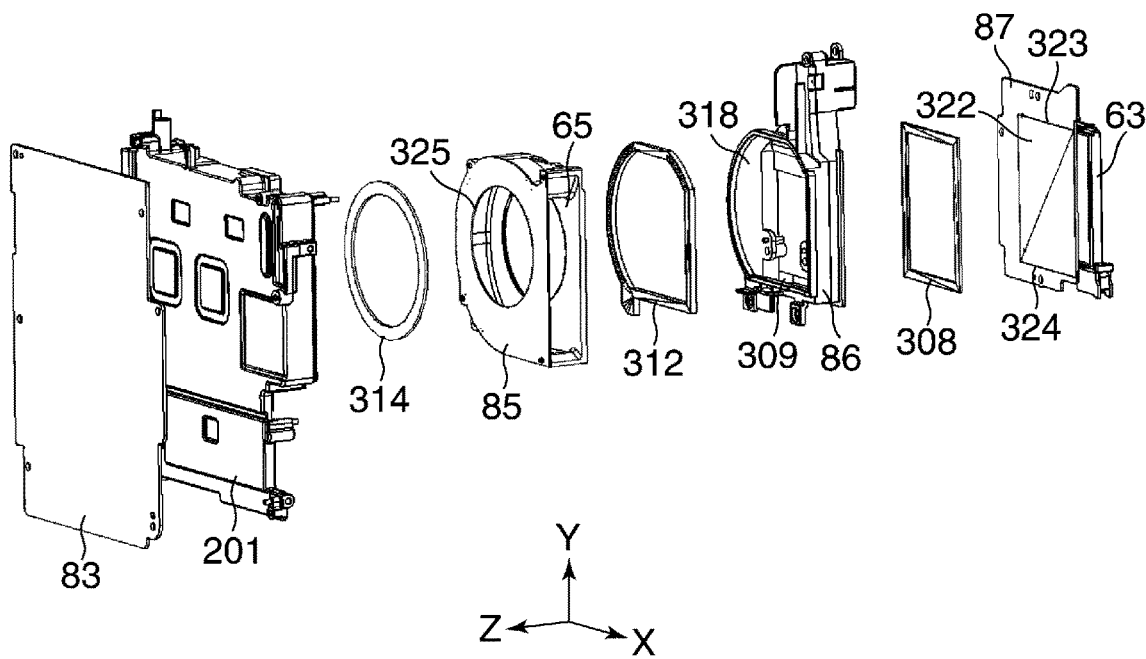
FIG. 19B is an exploded perspective view of the cooling unit shown in FIG. 19A.
Figure 20A:
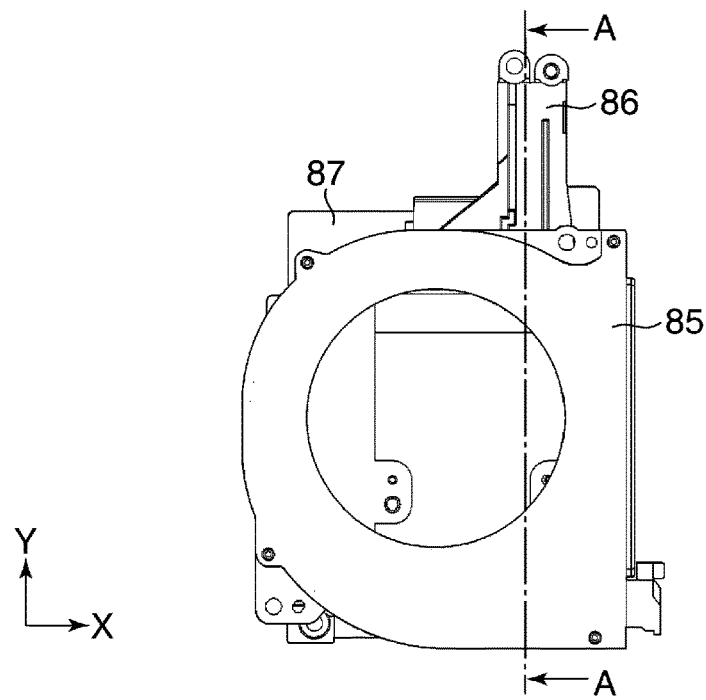
FIG. 20A is a view of a medium substrate, a third duct unit, and an air blower.
Figure 20B:
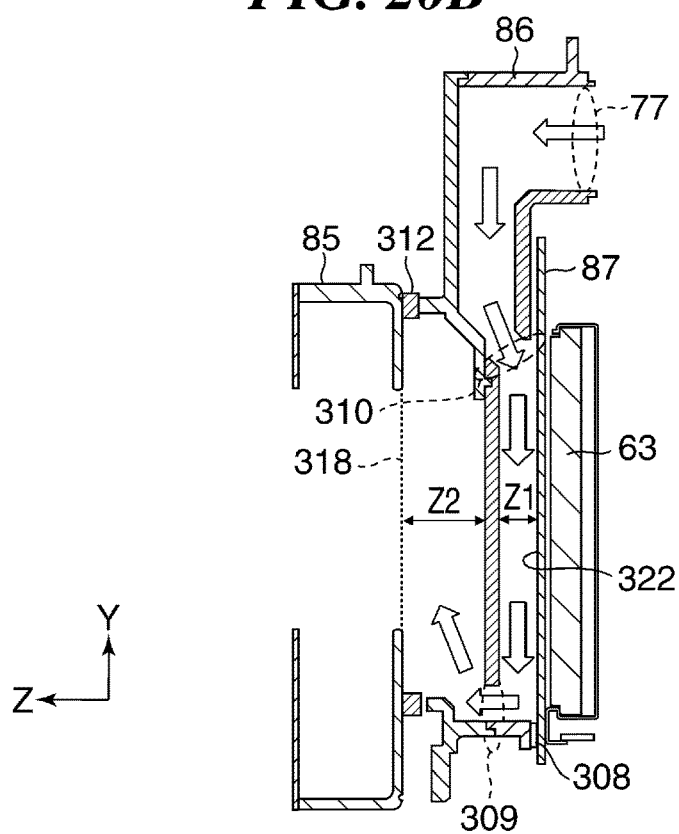
FIG. 20B is a cross-sectional view taken along A-A in FIG. 20A.
Figure 21:
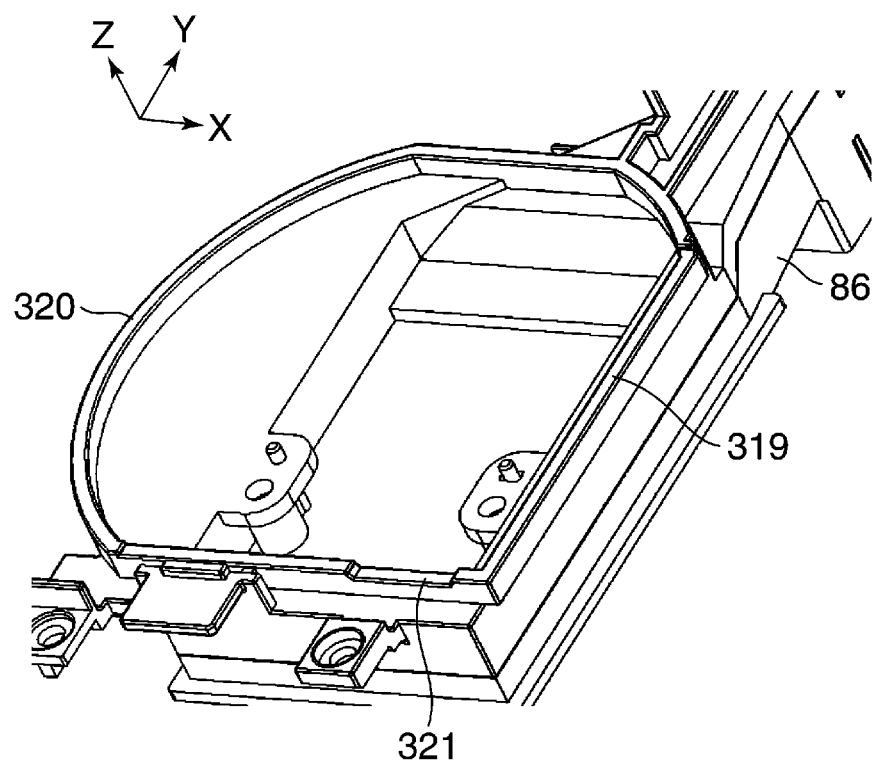
FIG. 21 is an enlarged perspective view of the third duct unit.

FIG. 18A is a perspective view of a cooling unit formed by the medium substrate 87, the third duct unit 86, the air blower 85, the second duct 201, and the main circuit board 83, as viewed from a −Z side (the rear side of the camera body 1). FIG. 18B is an exploded perspective view of the cooling unit shown in FIG. 18A. FIG. 19A is a perspective view of the cooling unit shown in FIG. 18A, as viewed from the +Z side (the front side of the camera body 1). FIG. 19B is an exploded perspective view of the cooling unit shown in FIG. 19A. FIG. 20A is a view of the medium substrate 87, the third duct unit 86, and the air blower 85, as viewed from the +Z side. FIG. 20B is a cross-sectional view taken along A-A in FIG. 20A. FIG. 21 is an enlarged perspective view of the third duct unit 86, as viewed from the +Z side.

Next, a description will be given of the heat dissipation structure of the medium 63 and the medium substrate 87, which uses the air blower 85, with reference to FIGS. 18B, 19B, and 20B. As shown in FIG. 20B, a suction force of the air blower 85 causes outside air to flow into the third duct unit 86 from the third intake port 77 in a direction indicated by an arrow in FIG. 20B. The outside air having flowed into the third duct unit 86 passes an inflow portion 310 formed in the third duct unit 86.

The third duct unit 86 has an opening 311 (FIG. 18B) having substantially the same size as that of a grounding surface 322 (FIG. 19B) which is formed on a surface of the medium substrate 87 opposite to the medium 63. The outside air flows from the opening 311 along a surface extending from a first grounding surface end 323 (FIG. 19B) to a second grounding surface end 324 (FIG. 19B) of the grounding surface 322 exposed into the third duct unit 86, and passes an outflow portion 309 formed in the third duct unit 86.

The outside air having passed through the outflow portion 309 passes a second discharge port 318 formed in the third duct unit 86, and is sucked in by the air blower 85, thereafter being discharged from the exhaust port 65 (FIG. 19B) of the air blower 85.

As shown in FIG. 18B, a first elastic member 308 is provided between the medium substrate 87 and the third duct unit 86. The first elastic member 308 covers the circumference of the opening 311 of the third duct unit 86, to thereby seal the opening 311. Further, a second elastic member 312 is provided between the third duct unit 86 and the air blower 85. The second elastic member 312 covers the circumference of the second discharge port 318 (FIG. 19B) of the third duct unit 86, and that of a second suction portion 313 of the air blower 85, to thereby seal the second discharge port 318 and the second suction portion 313.

The flow path is isolated from the other space of the camera body 1 by the first elastic member 308 and the second elastic member 312. Further, as shown in FIG. 20B, a width Z1 of a flow path along the grounding surface 322 of the medium substrate 87 in the Z direction is smaller than a width Z2 of a flow path in the Z direction in the vicinity of the air blower 85.

As described above, the grounding surface 322 of the medium substrate 87 is exposed from the opening 311 of the third duct unit 86 into the flow path, whereby it is possible to obtain an effect of enhancing the heat dissipation performances of the medium substrate 87 and the medium 63. Further, by reducing the width of the flow path in the optical axis direction on the grounding surface 322, it is possible to increase a flow velocity of air on the grounding surface 322. This provides an effect of enhancing the heat dissipation performances of the medium substrate 87 and the medium 63.

Further, the first elastic member 308 and the second elastic member 312 isolates a space formed by the third duct unit 86, the medium substrate 87, and the air blower 85 from the other space of the camera body 1. This provides effects of enhancing the dust-proof and splash-proof performance. Further, the inflow portion 310 is formed in the vicinity of the first grounding surface end 323 of the medium substrate 87, and the outflow portion 309 is formed in the vicinity of the second grounding surface end 324 of the medium substrate 87, whereby outside air flows substantially uniformly over the entire grounding surface 322, which provides the effect of enhancing the heat dissipation performance.

Next, a case where the air blower 85 is used for double-sided suction will be described with reference to FIGS. 18B and 19B. Here, the double-sided suction by the air blower 85 refers to suction of air from both of a first suction portion 325 (FIG. 19B) and the second suction portion 313 (FIG. 18B) which are provided on opposite sides of the air blower 85 in the Z direction.

As shown in FIG. 18B, the medium substrate 87, the first elastic member 308, the third duct unit 86, the second elastic member 312, the air blower 85, a third elastic member 314, the second duct 201, and the main circuit board 83 are arranged in the mentioned order from the −Z side to the +Z side. Here, the third intake port 77 of the third duct unit 86 is open in the −Z direction, the first intake port 42 of the second duct 201 is open in the −X direction, and the exhaust port 65 (FIG. 19B) of the air blower 85 is open in the +X direction.

Next, the outline of a method for sucking outside air from the first intake port 42 and dissipating the heat from the main circuit board 83 will be described with reference to FIG. 18B. Outside air is caused to flow into the second duct 201 from the first intake port 42 by the suction force of the air blower 85. At this time, since the main circuit board 83 and the second duct 201 are in contact with each other, heat generated by the main circuit board 83 is transferred to the second duct 201. Next, the outside air flowed in passes a first discharge port 315 of the second duct 201, flows into the first suction portion 325 (FIG. 19B) of the air blower 85, and then is discharged out of the camera body 1 through the exhaust port 65 (FIG. 19B).

Here, similar to the heat dissipation structure of the medium substrate 87, the third elastic member 314 is disposed between the air blower 85 and the second duct 201 such that it covers the circumferences of the first discharge port 315 and the first suction portion 325 (FIG. 19B). The structure for sucking outside air from the second suction portion 313 to dissipate the heat from the medium substrate 87 is the same as described above.

As described heretofore, by using the air blower 85 for double-sided suction, it is possible to cool two heat sources by the heat dissipation structure compact in size. Further, by combining the exhaust ports of the ducts into one, it is possible to enhance the dust-proofing and splash-proofing performance. Furthermore, by disposing the first intake port 42 and the third intake port 77 in respective different surfaces, it is possible to prevent the heat dissipation performance of the entire camera body 1 from being completely lost even if one of the intake ports is blocked.

Next, a description will be given of the flow rate of outside air flowing through the second duct 201 and the third duct unit 86. The cross-sectional area of the flow path in the second duct 201 is set to be larger than the cross-sectional area of the flow path in the third duct unit 86. This causes a larger amount of outside air to flow through the second duct 201 than the third duct unit 86. In the present embodiment, the main circuit board 83 is for image processing, and generates a larger amount of heat than the medium substrate 87. Therefore, the flow rate of air flowing through the second duct 201 is made larger than the flow rate of air flowing through the third duct unit 86 to thereby cool the main circuit board 83, laying more importance on the cooling of the main circuit board 83.

As described above, the air blower 85 is used for double-sided suction, and the flow paths for cooling the medium substrate 87 and the main circuit board 83 as heat sources are made independent of each other by the third duct unit 86 and the second duct 201, whereby it is possible to adjust the flow rates of air flowing on the respective heat sources according to the amounts of heat generated by the heat sources. This makes it possible to make efficient use of the suction and discharge forces of the air blower 85.

Next, with reference to FIG. 21, a description will be given of a structure in which the third duct unit 86 and the air blower 85 (FIG. 19B) are substantially sealed using the second elastic member 312 (FIG. 19B).

A surface of the third duct unit 86, which is in contact with the second elastic member 312, includes a second surface 320, a first surface 319, and a third surface 321, in the decreasing order of height in the +Z direction. The first surface 319 is disposed such that an image of the first surface 319 projected in the Z direction is in the vicinity of the exhaust port 65 (FIG. 19B). Further, the third surface 321 is a surface through which a wire, not shown, of the air blower 85 passes. By thus changing the heights of the surfaces of the third duct unit 86, which are in contact with the second elastic member 312, it is possible to adjust a force with which the second elastic member 312 pushes the air blower 85.

In the air blower 85 used in the present embodiment, the periphery of the exhaust port 65 has a smaller rigidity than the other parts thereof. To eliminate this inconvenience, by making the first surface 319 of the third duct unit 86 lower in the Z direction, a force with which the second elastic member 312 pushes the periphery of the exhaust port 65 of the air blower 85 is reduced to thereby reduce the amount of compression of the second elastic member 312. This makes it possible to prevent the exterior of the air blower 85 from being deformed to cause e.g. collision with a blade, not shown, of the air blower 85, thereby lowering the rotational speed of the air blower 85.

As described heretofore, in the present embodiment, the first duct unit 82 is arranged between the main circuit board 83 (second heat source) and the image pickup device unit 81 (first heat source). Further, the second duct unit 84 is arranged between the main circuit board 83 (second heat source) and the recording medium substrate 87 (third heat source), and the third duct unit 86 is arranged between the second duct unit 84 and the recording medium substrate 87. Therefore, it is possible to separate heat generated by the three heat sources 83, 81, and 87 by the three duct units 84, 82, and 86, for dissipation of the heat. With this, it is possible to efficiently dissipate the heat generated by the three heat sources 83, 81, and 87, and thereby reduce the respective influences of the heat from the three heat sources 83, 81, and 87 on the other heat sources.

Figure 22A:
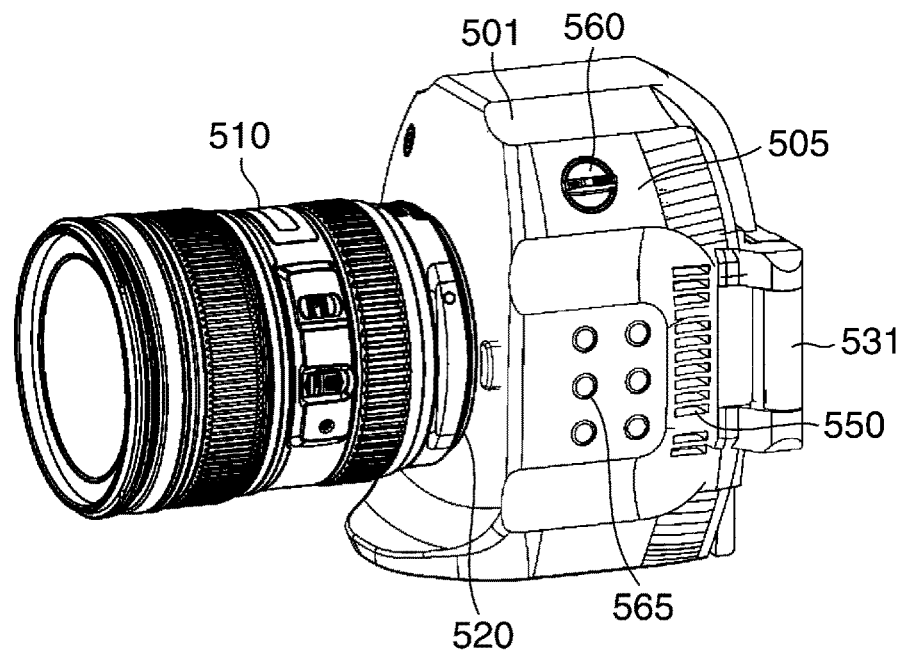
FIG. 22A is a perspective view of a lens-interchangeable digital video camera as an electronic apparatus according to a second embodiment of the present invention, as viewed from the front.
Figure 22B:
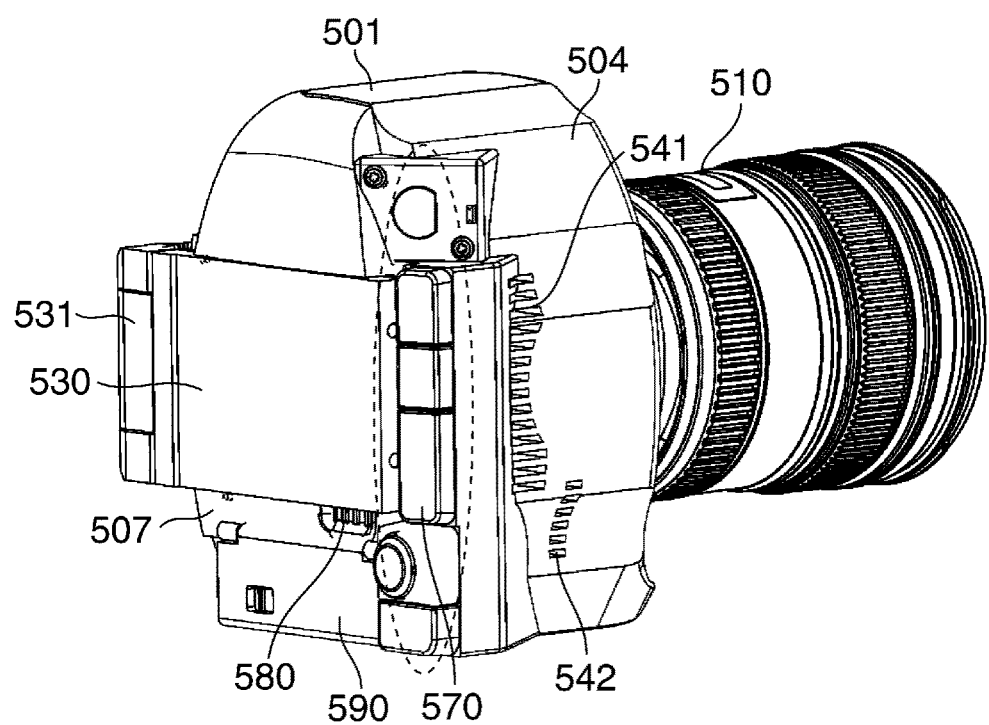
FIG. 22B is a perspective view of the digital video camera shown in FIG. 22A, as viewed from the rear.

Next, a description will be given of a lens-interchangeable digital video camera as an electronic apparatus according to a second embodiment of the present invention, with reference to FIGS. 22A to 38. FIG. 22A is a perspective view of the lens-interchangeable digital video camera as an electronic apparatus according to the second embodiment, as viewed from the front. FIG. 22B is a perspective view of the digital video camera shown in FIG. 22A, as viewed from the rear. Although in the present embodiment, the digital video camera, as an example of the image pickup apparatus, is described as the electronic apparatus of the present invention, by way of example, this is not limitative.

As shown in FIGS. 22A and 22B, the digital video camera (hereinafter referred to as the "camera") of the present embodiment has a camera body 501. On the front side of the camera body 501, there are provided an interchangeable lens portion 510, and a mount portion 520 for removably mounting the interchangeable lens portion 510. On a left side of the camera body 501, as viewed from the front thereof, there is provided a left side cover unit 504.

The left side cover unit 504 is provided with a first intake port 541 for taking outside air into a second duct unit 700 (see FIG. 27), described hereinafter, and a second intake port 542 for taking outside air into a first duct unit 710 (see FIG. 27), described hereinafter. Further, the left side cover unit 504 can be provided with a grip attachment portion to which is removably attached a grip unit, not shown, for the user to hold the camera body 501 when shooting. Arranged on the grip unit are a key for starting/stopping shooting, a battery for operating the camera body 501, and so forth. By electrically Connecting the grip unit to the camera body 501, it is possible to perform the above-mentioned operations.

On the right side of the camera body 501, as viewed from the front thereof, there is provided a right side cover unit 505. Right side surface operation keys 565 and a power dial 560 are arranged on the right side cover unit 505.

The right side surface operation keys 565 are buttons used for shooting and reproduction, and it is possible to assign functions to the respective right side surface operation keys 565. For example, the right side surface operation keys 565 are used for starting/stopping shooting, peaking, partially enlarging a shooting view angle, changing filter density of the ND unit, changing the rotational speed of an air blower, and so forth.

By turning the power dial 560, it is possible to switch on/off the power supply of the camera, and switch the camera to a reproduction mode. Further, the right side cover unit 505 is provided with an exhaust port 550 for discharging air out of the camera body 501 by an air blower 650 (see FIG. 27), described hereinafter.

On the rear side of the camera body 501, there is provided a rear cover unit 507. At a lower portion of the rear cover unit 507, there is provided a recording medium cover 590 for protecting a first recording medium 622 and a second recording medium 642 (see FIG. 36) which are capable of recording data obtained by shooting using the camera body 501. The data can be simultaneously recorded in the first recording medium 622 and the second recording medium 642. Further, it is possible to select one of the recording media 622 and 642, and record data in the selected recording medium. The first recording medium 622 can record data at a higher speed and consumes a larger amount of power, than the second recording medium 642.

Further, in a central part of the rear cover unit 507, there is provided a display panel portion 530. The display panel portion 530 is supported on the camera body 501 via a panel hinge portion 531 provided on a side of the rear cover unit 507 toward the right side cover unit 505, such that the display panel portion 530 can be pivotally moved with respect to the camera body 501 in an opening/closing direction and also can be rotated in an open state thereof. This makes it possible to check an image on the rear of the camera body 501 after the display panel portion 530 has been turned over and accommodated in the camera body 501.

Further, a third intake port 580 for taking outside air into a third duct unit 720 (see FIG. 27), described hereinafter, is arranged on the rear Cover unit 507 in the vicinity of the recording medium cover 590. Furthermore, an external interface portion 570 is arranged on the rear of the display panel portion 530 toward the left side cover unit 504. The external interface portion 570 includes e.g. a BNC connector for outputting an SDI signal, an HDMI (registered trademark) connector for video output, a power connector for supplying power, a headphone connector for voice output, and so forth.

Figure 23:
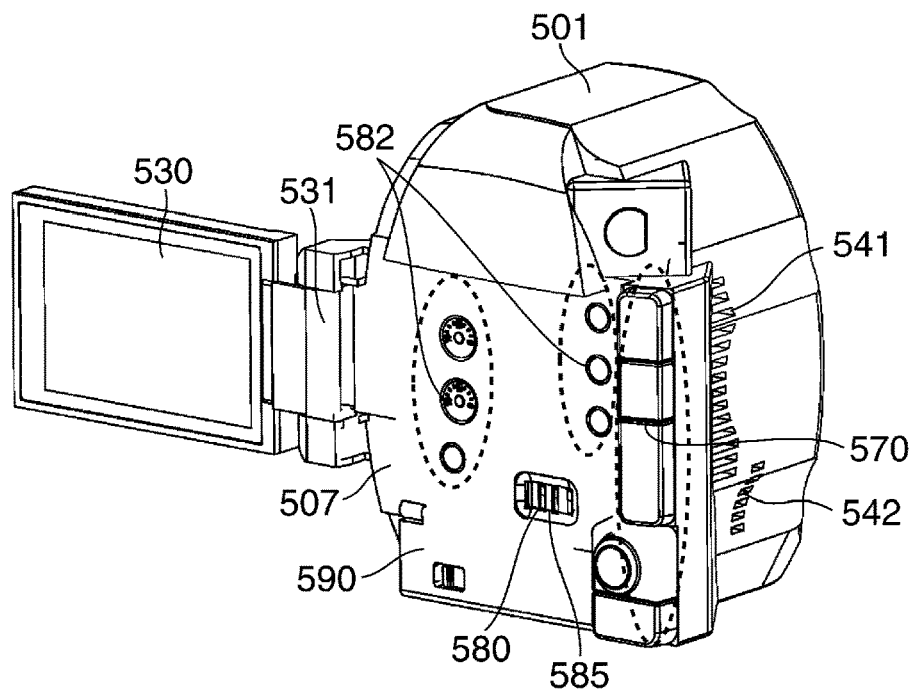
FIG. 23 is a perspective view of a camera body in a state in which a display panel portion is open, as viewed from the rear thereof.

FIG. 23 is a perspective view of the camera body 501 in a state in which the display panel portion 530 is open, as viewed from the rear thereof. As shown in FIG. 23, in a central portion of the rear of the camera body 501, there are provided rear operation keys 582 for displaying a menu, performing display operations, selecting input voice, and setting the level of the volume of the voice.

Figure 24:
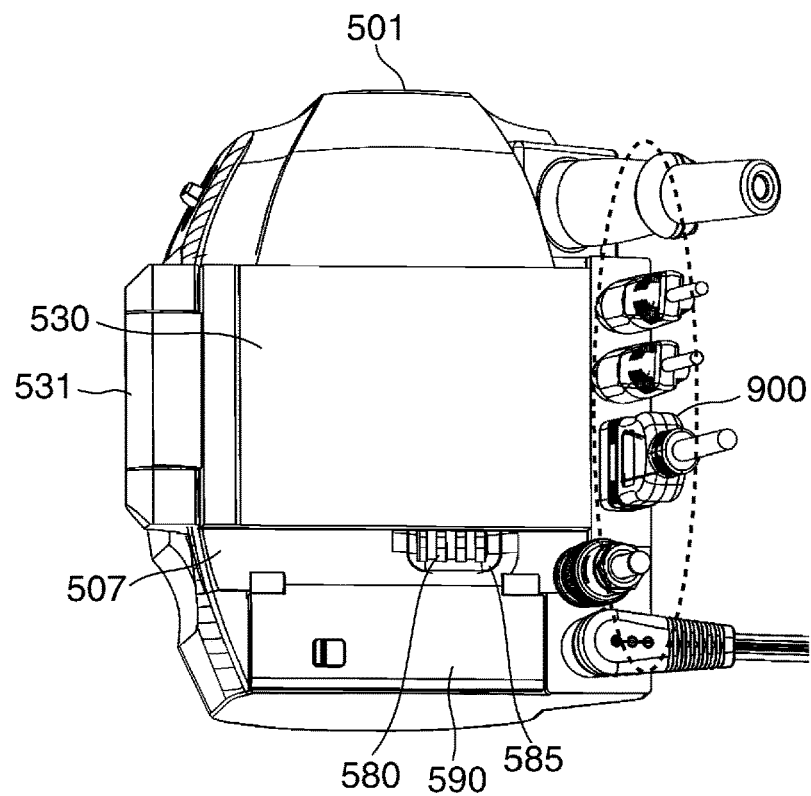
FIG. 24 is a perspective view of the camera body in a state in which an external interface terminal of an external connection cable is connected to an external interface portion of the camera body, as viewed from the rear of the camera body.

FIG. 24 is a perpective view of the camera body 501 in a state in which an external interface terminal 900 of an external connection cable is connected to the external interface portion 570 of the camera body 501, as viewed from the rear of the camera body 501. As shown in FIG. 24, in the state in which the external interface terminal 900 is connected to the external interface portion 570, the display panel portion 530 cannot be opened as in FIG. 23, e.g. by inserting a finger from the side of the left side Cover unit 504 on the rear of the camera body 501.

To solve this problem, in the present embodiment, as shown in FIGS. 23 and 24, a concave-shaped rear finger-putting portion 585 is formed in the rear cover unit 507 at a location below the display panel portion (display unit) 530. Further, the external interface portion 570 is provided on an opposite side of the display panel portion 530 from the panel hinge portion 531.

Figure 25:
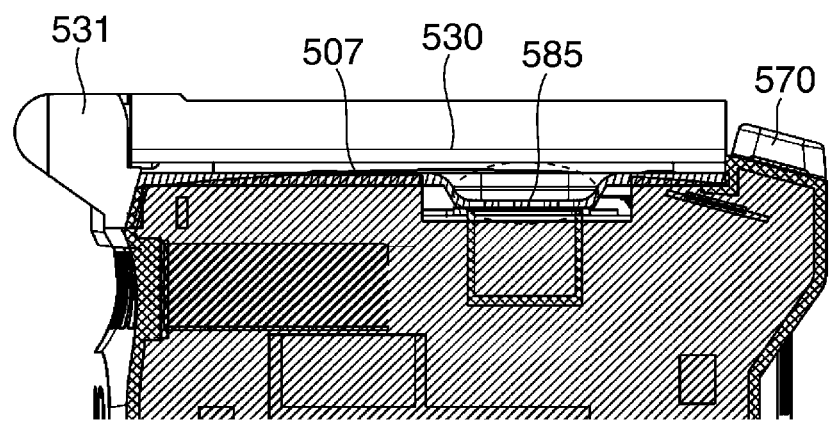
FIG. 25 is a cross-sectional view of essential parts of a portion of the camera body in the vicinity of a rear finger-putting portion of the camera body.

FIG. 25 is a cross-sectional view of essential parts of a portion of the camera body 501 in the vicinity of the rear finger-putting portion 585. As shown in FIG. 25, the rear finger-putting portion 585 is in such a positional relationship with the display panel portion 530 as shown in FIGS. 24 and 25 that a rear projected image of the rear finger-putting portion 585 partially overlaps the display panel portion 530 in a state accommodated in the rear of the camera body (apparatus body) 501. In other words, the rear finger-putting portion 585 is partially exposed to outside in the state in which the display panel portion 530 is accommodated in the rear of the camera body (apparatus body) 501.

Figure 26:
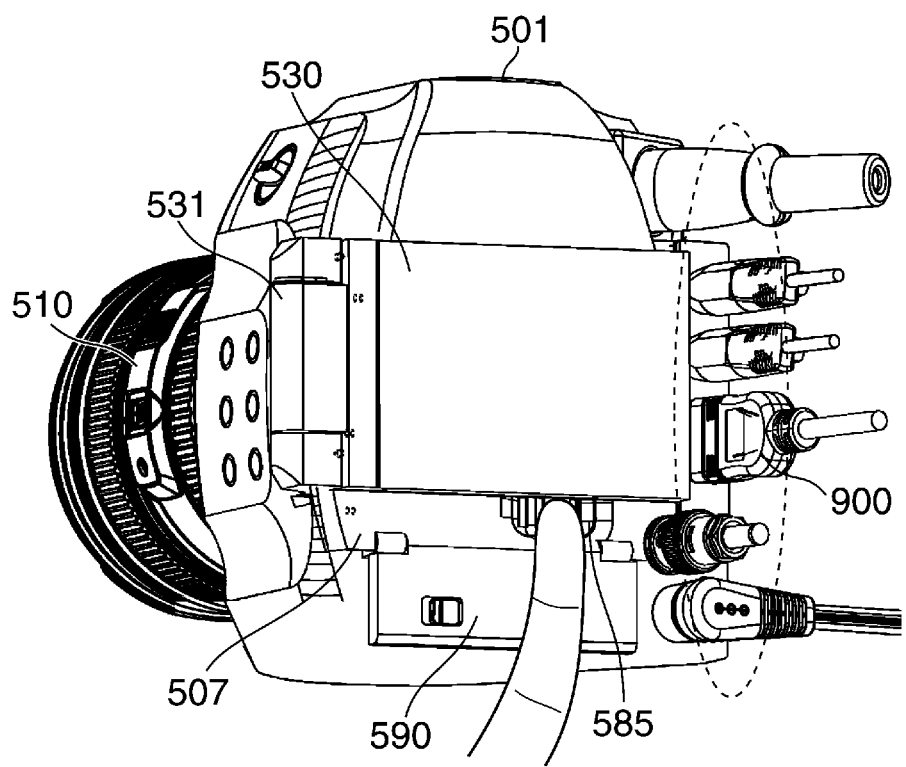
FIG. 26 is a perspective view of the camera body in a state in which a photographer is opening the display panel portion by putting a finger on the rear finger-putting portion.

Further, the rear finger-putting portion 585 is disposed in the rear cover unit 507 on a side, with respect to the center of the display panel portion 530 in the accommodated state, toward the left side Cover unit 504, i.e. a side more distant from the panel hinge portion 531 than the center of the display panel portion 530. With the above arrangement and shape, as shown in FIG. 26, the display panel portion 530 can be easily opened by the photographer who puts a finger of his or hers from below on the rear finger-putting portion 585.

Further, the third intake port 580 is formed in the rear finger-putting portion 585, which makes it unnecessary to provide a space for an additional opening for air suction, and makes it possible to contribute to size reduction of the camera body 501. Moreover, it is also possible to stably take in air even in the state in which the display panel portion 530 is accommodated. Further, it is possible to dissipate heat from the display panel portion 530, and in addition, to realize a splash-proof structure which prevents water droplets or the like from blowing or flowing into the camera body 501 from above.

Figure 27:
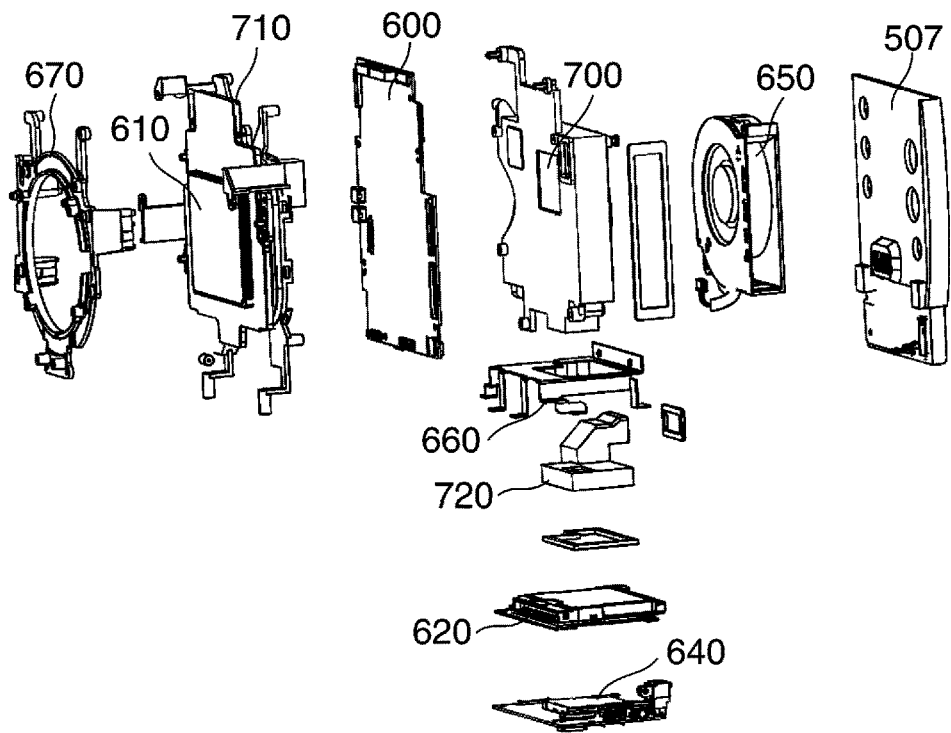
FIG. 27 is an exploded perspective view of the camera body.

Next, the internal structure of the camera body 501 will be described with reference to FIG. 27. FIG. 27 is an exploded perspective view of the camera body 501. In FIG. 27, appearance cover units are omitted from illustration.

The camera body 501 is comprised of a mount fixing member 670, an image pickup device unit 610, the first duct unit 710, a main circuit board 600, the second duct unit 700, the air blower 650, and the rear cover unit 507, which are arranged from the front to the rear in the mentioned order. A unit formed by integrally combining the main circuit board 600, the second duct unit 700, and the air blower 650 with each other is referred to as a main unit.

The image pickup device unit 610 is a first heat source which generates heat when shooting. The first duct unit 710 is provided with a ventilation passage, for connection between the second intake port 542 and the exhaust port 550, referred to above. Heat generated by the image pickup device unit 610 is transferred to the first duct unit 710, whereby the image pickup device unit 610 is cooled.

The main circuit board 600 (second heat source) controls the camera body 501, and accessories and the like connected to the camera body 501. The main circuit board 600 includes a plurality of heat sources mounted thereon, and in the present embodiment, the main circuit board 600 consumes the largest amount of electric power and generates the largest amount of heat. On the rear side of the main circuit board 600, the second eruct unit 700 is disposed. The second eruct unit 700 is provided with a ventilation passage, for connection between the first intake port 541 and the exhaust port 550, referred to above. Further, heat generated by the main circuit board 600 is transferred to the second duct unit 700, whereby the main circuit board 600 is cooled.

Below the air blower 650, the third duct unit 720 is disposed, and below the third duct unit 720, there is disposed a first recording medium unit 620 (third heat source) on which the first recording medium 622 (see FIG. 36) can be mounted. The third duct unit 720 is provided with a ventilation passage, for connection between the third intake port 580 and the exhaust port 550, referred to above.

The first recording medium 622 generates heat when recording data. Therefore, the first recording medium 622 is cooled by the third duct unit 720. Further, below the first recording medium unit 620, there is disposed a second recording medium unit 640 on which the second recording medium 642 can be mounted. The first recording medium unit 620 and the second recording medium unit 640 are held by a holding unit 660.

Figure 28:
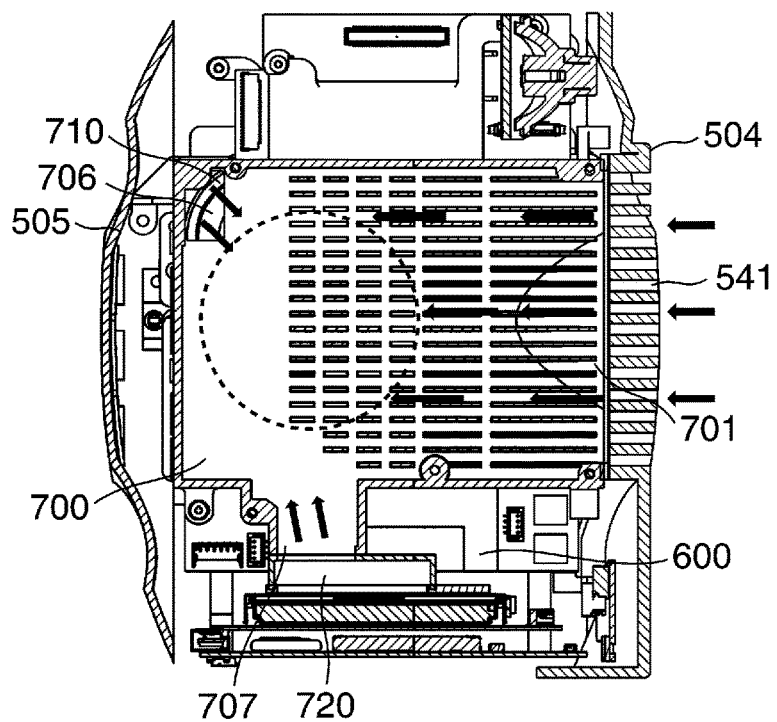
FIG. 28 is a cross-sectional view of the camera body taken along a direction perpendicular to the optical axis, as viewed from the rear of the camera body.
Figure 29:
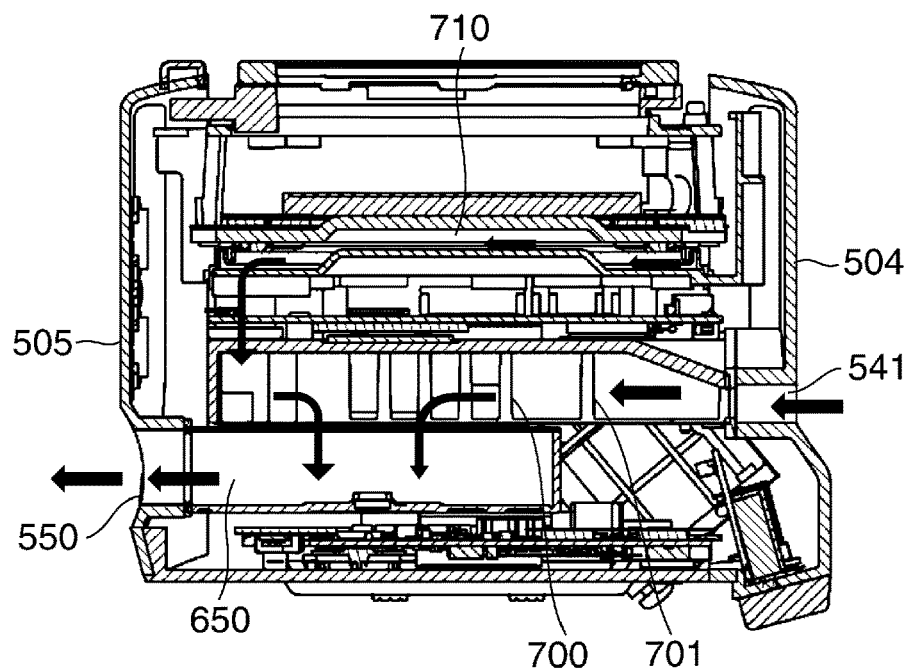
FIG. 29 is a cross-sectional view of the camera body taken along the optical axis direction, as viewed from the top of the camera body.

Next, flows of air generated by the air blower 650 will be described with reference to FIGS. 28 and 29. FIG. 28 is a cross-sectional view of the camera body 501 along the direction perpendicular to the optical axis, as viewed from the rear of the camera body 501. FIG. 29 is a cross-sectional view of the camera body 501 along the optical axis direction, as viewed from the top of the camera body 501. Note that arrows appearing in FIGS. 28 and 29 indicate the flows of air generated by the air blower 650.

As shown in FIGS. 28 and 29, outside air is taken into the camera body 501 from the first intake port 541, and the taken-in air is taken into the air blower 650 through the second duct unit 700. At the same time, outside air is taken in also from the second intake port 542 (see FIG. 22B). The taken-in air passes the first duct unit 710, and flows through a second duct connection port 706 formed in the second duct unit 700 to be taken into the air blower 650.

Further, at the same time, outside air is taken in also from the third intake port 580 (see FIG. 22B). The taken-in air passes the third duct unit 720, and flows through a third duct connection port 707 formed in the second eruct unit 700 to be taken into the air blower 650. The air taken in from the three intake ports 541, 542, and 580 is discharged out of the camera body 501 through the exhaust port 550.

As described above, heat from the main circuit board 600 as the second heat source is dissipated by the second eruct unit 700, and heat from the image pickup device unit 610 as the first heat source is dissipated by the first duct unit 710. Further, heat from the first recording medium unit 620 as the third heat source is dissipated by the third duct unit 720.

Further, the first duct unit 710 is arranged between the main circuit board 600 and the image pickup device unit 610. This makes it possible to prevent heat generated by the main circuit board 600, which generates a larger amount of heat than the image pickup device unit 610, from being transferred to the image pickup device unit 610. Further, the third duct unit 720 is arranged between the main circuit board 600 and the first recording medium unit 620. This makes it possible to prevent heat generated by the main circuit board 600, which generates a larger amount of heat than the first recording medium unit 620, from being transferred to the first recording medium unit 620 and the first recording medium 622.

In addition, as shown in FIG. 28, air flowing through the first duct unit 710 and air flowing through the third duct unit 720 flow into the second duct unit 700 from respective locations whose images projected onto the blower 650 are substantially diagonal across an intake portion of the air blower 650, such that these air flows do not interfere with an air flow through the second duct unit 700, and do not interfere with each other. The air which has flowed into the second duct unit 700 is taken in by the air blower 650. Therefore, the air blower 650 can be implemented by a single-sided suction type, and this eliminates the need of disposing a duct unit on a side of the air blower 650 toward the rear cover unit 507. As a consequence, it is possible to reduce the thickness of the camera body 501 in the optical axis direction, thereby making it possible to attain the size reduction of the camera body 501.

As described hereinabove, in the present embodiment, the three heat sources 600, 610, and 620 are separated by the ducts 700, 710, and 720, respectively, whereby it is possible to attain size reduction of the camera while preventing each of the heat sources 600, 610, and 620 from being influenced by heat generated by the other heat sources.

Figure 30:
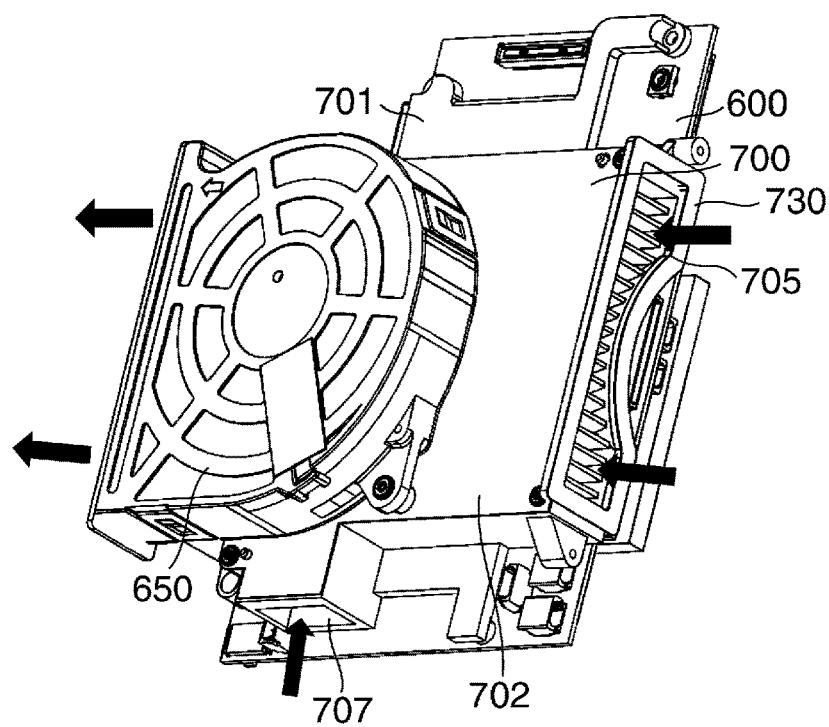
FIG. 30 is a perspective view of a main unit formed by integrally combining a first duct unit, a main circuit board, and an air blower, with each other.
Figure 31:
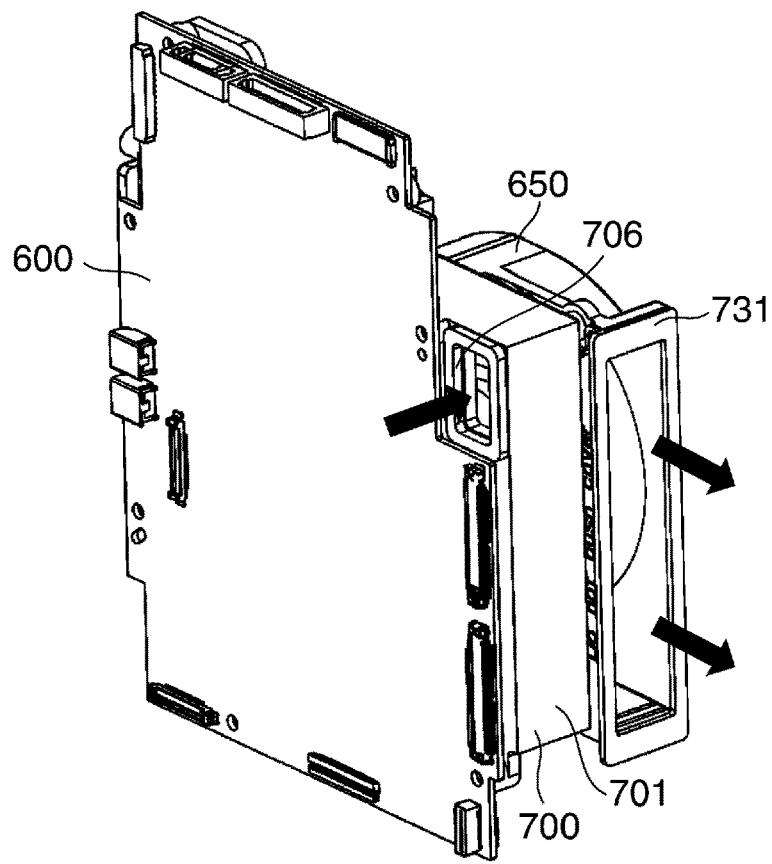
FIG. 31 is a perspective view of the main unit shown in FIG. 30, as viewed from the rear.
Figure 32:
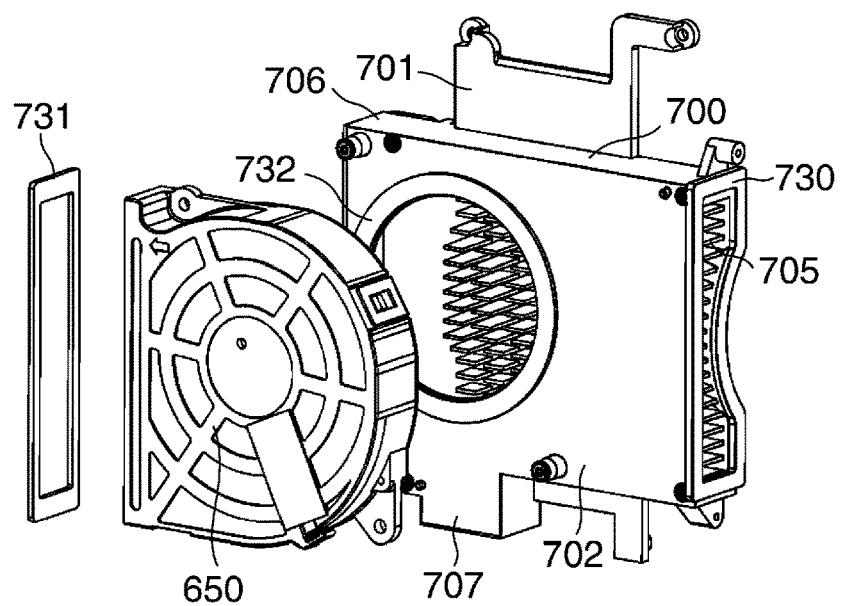
FIG. 32 is an exploded perspective view of the main unit shown in FIG. 30.

Next, the structure of the second duct unit 700 will be described with reference to FIGS. 30 to 32. FIG. 30 is a perspective view of the main unit formed by integrally combining the second duct unit 700, the main circuit board 600, and the air blower 650 with each other. FIG. 31 is a perspective view of the main unit shown in FIG. 30, as viewed from the rear thereof. FIG. 32 is an exploded perspective view of the main unit shown in FIG. 30. In FIG. 32, however, the main circuit board 600 is omitted from illustration. Note that arrows appearing in FIGS. 30 and 31 indicate flows of air generated by the air blower 650.

A first duct 701 as a component of the second duct unit 700 is formed of a metal member having an excellent heat conductivity or the like. The second duct unit 700 is covered with a first duct cover 702, thereby forming a ventilation passage from which no air leaks. Further, a first duct intake port 705 is connected to a portion of the first duct 701, which is in contact with the first intake port 541 (see FIG. 22B), via an elastic member 730 which also plays the role of a cushioning material, such that air is prevented from leaking to the other portions.

The main circuit board 600 and the first duct 701 are arranged to overlap each other in the optical axis direction such that main devices mounted on the main circuit board 600 and the first duct 701 for heat dissipation are in contact with each other, whereby it is possible to transfer heat from the main devices to the first duct 701 made of the metal member or the like. Note that a heat dissipation rubber or the like may be interposed between the main devices and the first duct 701 such that heat can be efficiently transferred to the first duct 701.

Further, the second duct unit 700 is provided with the second duct connection port 706 connected to the first duct unit 710 (see FIG. 28), and the third duct connection port 707 connected to the third duct unit 720 (see FIG. 28), such that air flows from the second and third duct units 710 and 720 into the second duct unit 700.

Further, an elastic member 732 is interposed between the first duct cover 702 and an intake portion of the air blower 650 such that air is prevented from leaking while ensuring efficient flows of air. Further, an elastic member 731 for filling a gap between the air blower 650 and the exhaust port 550 is provided on an exhaust side of the air blower 650.

Figure 33:
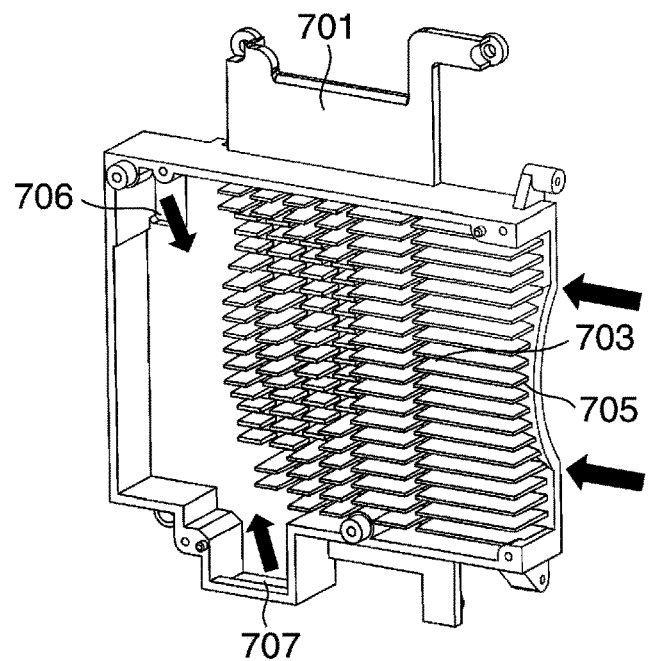
FIG. 33 is a perspective view of a first duct.

FIG. 33 is a perspective view of the first duct 701. As shown in FIG. 33, a large number of first duct fins 703 are erected inside the first duct 701. Although in the present embodiment, the first duct fins 703 are integrally formed with the first duct 701, the first duct fins 703 may be implemented by a heat sink which is formed separately from the first duct 701 and is fixed to the first duct 701. By thus erecting the large number of fins 703, it is possible to increase surface areas where air flowing through the second duct unit 700 touches, and hence the heat is more efficiently transferred to the air for dissipation.

In doing this, the flow path of the air flowing through the second duct unit 700 is limited by the first duct 701 and the first duct cover 702, whereby it is possible to cause the air to efficiently flow, which increases the heat dissipation effect. Further, the first duct intake port 705, the second duct connection port 706 and the third duct connection port 707 are arranged at respective locations whose images projected onto the blower 650 are substantially diagonal across the intake portion of the air blower 650, such that air flowing from the first duct intake port 705, air flowing from the second duct connection port 706, and air flowing from the third duct connection port 707 do not interfere with each other. This makes it possible to ensure efficient flows of air, and also prevent mixed heat flow.

Note that the locations of the first duct intake port 705, the second duct connection port 706, and the third duct connection port 707 are not necessarily limited to the locations whose images projected onto the air blower 650 are substantially diagonal across the intake portion of the air blower 650, but the first duct intake port 705 and the second duct connection port 706 may be arranged at any other suitable locations insofar as interference between the air flows does not occur.

Figure 34:
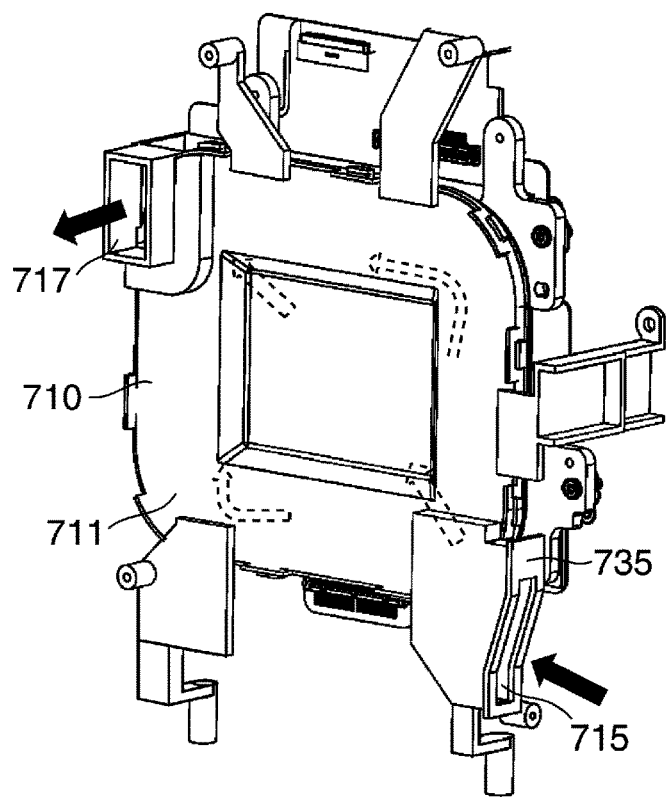
FIG. 34 is a perspective view of a second duct unit and an image pickup device unit, as viewed from the rear of the camera body.
Figure 35:
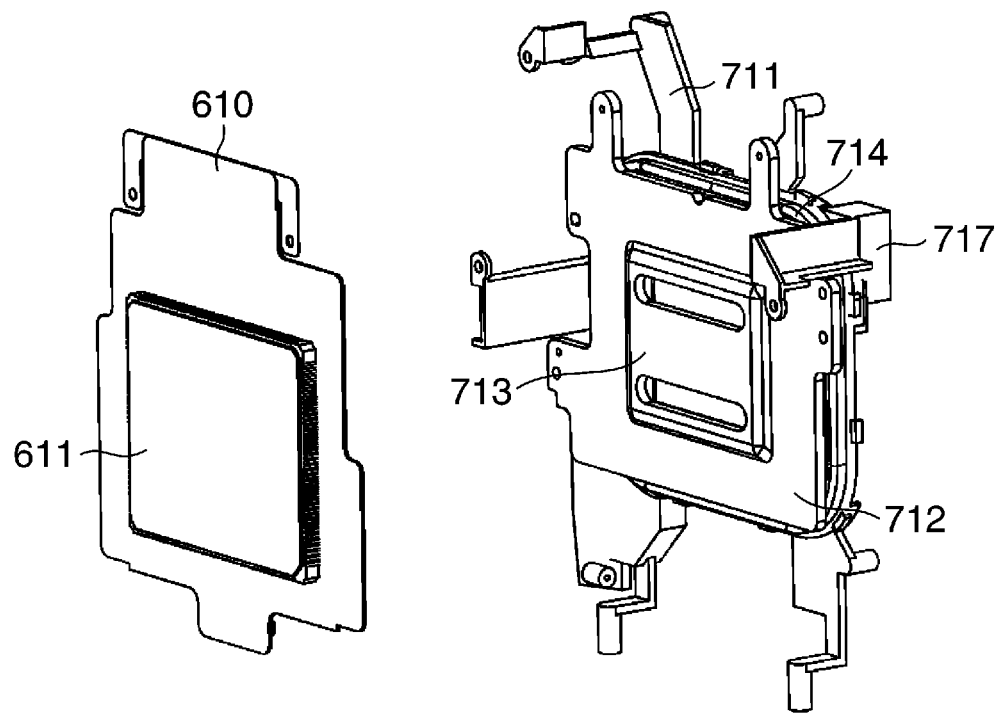
FIG. 35 is an exploded perspective view of the second duct unit and the image pickup device unit, as viewed from the front of the camera body.

Next, the structures of the first duct unit 710 and the image pickup device unit 610 will be described with reference to FIGS. 34 and 35. FIG. 34 is a perspective view of the first duct unit 710 and the image pickup device unit 610, as viewed from the rear of the camera body 501. FIG. 35 is an exploded perspective view of the first duct unit 710 and the image pickup device unit 610, as viewed from the front of the camera body 501. Note that arrows appearing in FIG. 34 indicate flows of air generated by the air blower 650.

The first duct unit 710 is comprised of an image pickup device heat transfer member 712 and a second duct 711 for heat dissipation. The second duct 711 is covered with the image pickup device heat transfer member 712 and a second duct seal material 714, to thereby form a ventilation passage such that air does not leak therefrom. The image pickup device heat transfer member 712 is formed of a material having a high heat conductivity, and has a heat conductive surface 713 which is brought into contact with an image pickup device 611 of the image pickup device unit 610 and is fixed thereto. With this, heat is transferred from the image pickup device 611 to the image pickup device heat transfer member 712 via the heat conductive surface 713. The heat conductive surface 713 is in contact with a surface of the image pickup device 611 opposite to the image pickup surface.

Air having flowed from a second duct intake port 715 connected to the second intake port 542 (see FIG. 22B) passes through the ventilation passage formed by the second duct 711, the image pickup device heat transfer member 712, and the second duct seal material 714, and is discharged into a second duct exhaust port 717. An elastic member 735 is disposed between the second intake port 542 and the second duct intake port 715 such that the air is prevented from leaking into the other portions. The second duct exhaust port 717 is connected to the second duct connection port 706, and air taken into the air blower 650 is discharged out from the exhaust port 550.

Further, the second duct intake port 715 and the second duct exhaust port 717 are arranged diagonal with respect to the image pickup device 611 and the heat conductive surface 713, whereby it is possible to cause the maximum amount of air to flow on the surface of the image pickup device heat transfer member 712. This makes it possible to increase a surface area which touches the air, thereby making it possible to more efficiently transfer heat to the air for dissipation.

Figure 36:
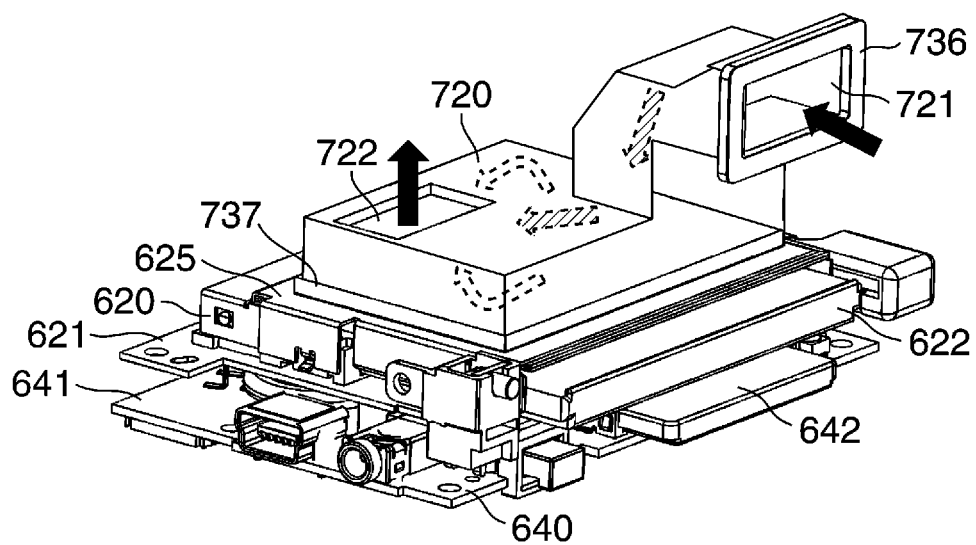
FIG. 36 is a perspective view of a third duct unit, a first recording medium unit, a second recording medium unit, and components associated therewith.
Figure 37:
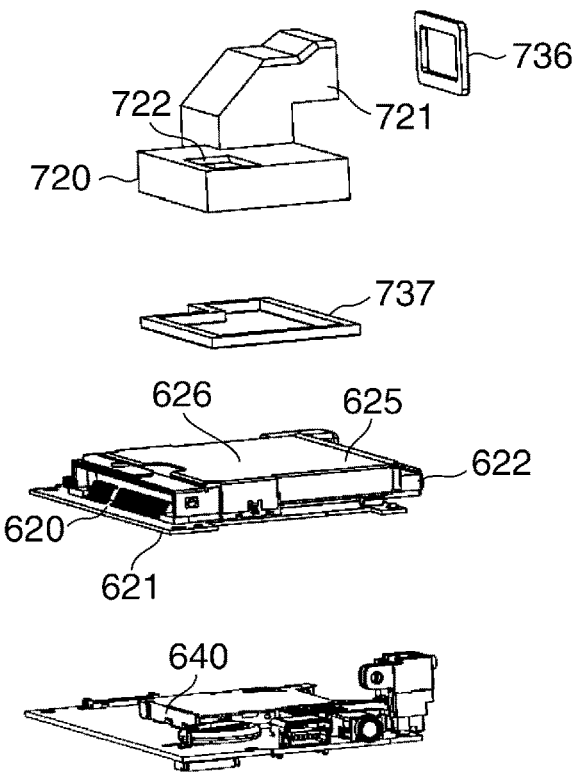
FIG. 37 is an exploded perspective view of the third duct unit, the first recording medium unit, the second recording medium unit, and the components associated therewith.
Figure 38:
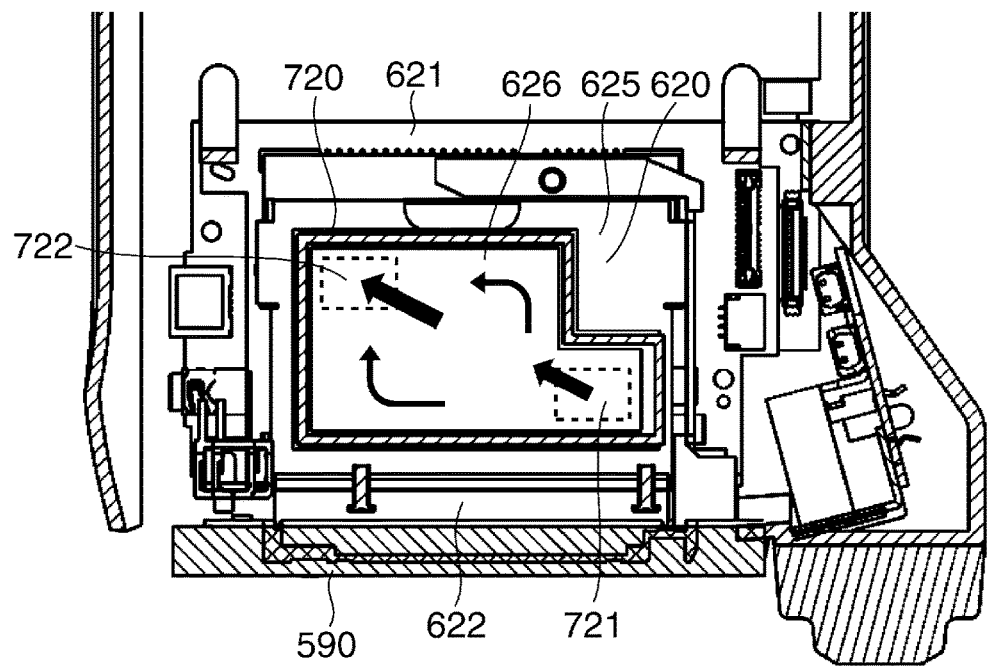
FIG. 38 is a cross-sectional view of essential parts of a heat dissipation structure of the third duct unit, and the components associated therewith.

Next, with reference to FIGS. 36 to 38, a description will be given of the structure of the third duct unit 720, the first recording medium unit 620, and components associated therewith. FIG. 36 is a perspective view of the third duct unit 720, the first recording medium unit 620, the second recording medium unit 640, and components associated therewith. FIG. 37 is an exploded perspective view of the third duct unit 720, the first recording medium unit 620, the second recording medium unit 640, and the components associated therewith. FIG. 38 is a cross-sectional view of essential parts of the heat dissipation structure of the third duct unit 720 and the components associated therewith. Note that arrows appearing in FIGS. 36 and 38 indicate flows of air generated by the air blower 650.

The first recording medium unit 620 is comprised of a first medium substrate 621, and a holding case portion (holding member) 625, which is electrically and thermally connected to the first medium substrate 621 e.g. by soldering, for holding the first recording medium 622 and so forth. Further, a top (flat portion) 626 of the holding case portion 625 has e.g. a rectangular shape, and is disposed substantially parallel to the first medium substrate 621. Heat generated by the first recording medium 622 is transferred to the first medium substrate 621, and the top 626 of the holding case portion 625.

Further, the third duct unit 720 is covered with the top 626 of the holding case portion 625, and the two are sealed with an elastic member 737, to thereby form a ventilation passage from which no air leaks.

Air having flowed from a third duct intake port 721 connected to the third intake port 580 (see FIG. 22B) passes through the ventilation passage formed by the third duct unit 720, the top 626 of the holding case portion 625, and the elastic member 737, and is discharged into a third duct exhaust port 722. An elastic member 736 is disposed between the third intake port 580 and the third duct intake port 721 such that the air is prevented from leaking to the other portions.

As shown in FIG. 38, the third duct intake port 721 and the third duct exhaust port 722 are arranged such that images thereof projected onto the top 626 of the holding case portion 625 are substantially diagonal with respect to the top 626 of the holding case portion 625, whereby it is possible to cause the maximum amount of air to flow on the surface of the top 626, thereby making it possible to increase a surface area which touches air. This makes it possible to more efficiently transfer heat generated from the first recording medium 622 to air, for dissipation.

Further, the third duct unit 720 is disposed on a side of the first medium substrate 621 where the first recording medium 622 and the holding case portion 625 are disposed, i.e. on a side which forms a dead space in mounting electronic components. As a consequence, it is possible to mount various electronic components on a surface of the first medium substrate 621 opposite to the holding case portion 625, thereby making it possible to realize the size reduction of the camera body 501. Further, it is also possible to realize the size reduction by disposing the second recording medium unit 640 including the second recording medium 642, and so forth, on the surface of the first medium substrate 621 opposite to the holding case portion 625.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. Note that the invention is not limited to the above-described embodiments, but the material, shape, dimension, form, number, and location of each of the components can be modified on an as-needed basis, without departing from the spirit and scope thereof.

This application claims the benefit of Japanese Patent Application No. 2017-059174 filed Mar. 24, 2017 and Japanese Patent Application No. 2017-236267 filed Dec. 8, 2017 which are hereby incorporated by reference herein in their entirety.

What is claimed is:

1. An electronic apparatus, comprising:
   a first duct that is disposed between a first heat source and a second heat source, for dissipating heat from the first heat source to an outside;
   a second duct that is disposed at a location where the second duct and the first duct sandwich the second heat source, for dissipating heat from the second heat source to the outside;
   a heat dissipation member fixed to the first heat source; and
   a holding member that holds the heat dissipation member via an elastic member,
   wherein a flow path of the first duct is formed between the heat dissipation member and the holding member.

2. The electronic apparatus according to claim 1, further comprising:
   a third duct that is disposed between the second duct and a third heat source, for dissipating heat from the third heat source to the outside.

3. The electronic apparatus according to claim 2, wherein the first duct, the second duct, and the third duct are arranged substantially parallel to each other.

4. The electronic apparatus according to claim 2, wherein the first duct, the second duct, and the third duct are arranged to in parallel along an optical axis direction.

5. The electronic apparatus according to claim 2, further comprising an air blower arranged between the second duct and the third duct,
   wherein the air blower for sucking takes outside air into the second duct and the third duct.

6. The electronic apparatus according to claim 5, wherein the third duct includes a flow path of outside air that flows along the third heat source and a flow path of outside air that flows in the vicinity of the air blower, and
   wherein a width of the flow path of outside air that flows along the third heat source is formed to be smaller than a width of the flow path of outside air that flows in the vicinity of the air blower.

7. The electronic apparatus according to claim 2, wherein the first duct is connected to the second duct.

8. The electronic apparatus according to claim 7, further comprising an air blower arranged between the second duct and the third duct,
   wherein the air blower takes outside air into the first duct, the second duct, and the third duct.

9. The electronic apparatus according to claim 2, wherein the third heat source includes a recording unit.

10. The electronic apparatus according to claim 1, wherein the elastic member is elastically deformable with respect to the heat dissipation member in a direction perpendicular to the optical axis.

11. The electronic apparatus according to claim 1, wherein the holding member is formed of an optically transparent material.

12. The electronic apparatus according to claim 1, wherein the second duct includes at least upstream-side fins and downstream-side fins that are arranged at a fixed pitch in a direction perpendicular to a flow path direction thereof, and
    wherein the upstream-side fins and the downstream-side fins are arranged offset from each other by a half pitch.

13. The electronic apparatus according to claim 12, wherein a cutout portion is formed in an outer shape portion of the second duct such that cross-sectional areas of all of flow paths between the upstream-side fins and flow paths between the downstream-side fins are substantially uniform.

14. The electronic apparatus according to claim 13, wherein the second duct includes a radiator plate disposed at a location different from locations of the upstream-side fins and the downstream-side fins.

15. The electronic apparatus according to claim 1, wherein the second heat source generates a larger amount of heat than the first heat source.

16. The electronic apparatus according to claim 15, wherein on a side of the first duct opposed to the second heat source, a member having a lower heat conductivity is disposed than on a side of the first duct opposed to the first heat source.

17. The electronic apparatus according to claim 15, wherein a cross-sectional area of a flow path of the second duct is larger than cross-sectional areas of flow paths of the other ducts.

18. The electronic apparatus according to claim 1, wherein a surface of the first duct opposed to the second heat source, and a surface of the first duct opposed to the first heat source are electrically connected by a conductive member, and the conductive member is disposed at a location where a flow path of air flowing through the first duct is formed.

19. The electronic apparatus according to claim 1, wherein the electronic apparatus includes an image pickup apparatus, and
    wherein the first heat source includes an image pickup device unit, and the second heat source includes an image processor.

20. The electronic apparatus according to claim 1, further comprising an air blower.

21. An electronic apparatus, comprising:
    a recording medium substrate;
    a holding member that is connected to the recording medium substrate, for holding a recording medium; and
    a heat dissipation duct that includes an intake port and an exhaust port,
    wherein the duct and the holding member are sealed with an elastic member.

22. The electronic apparatus according to claim 21, wherein the electronic apparatus includes a medium cover for protecting the recording medium, and
    wherein the intake port is disposed in the vicinity of the medium cover, and also on a side of the medium substrate, on which the holding member is disposed.

23. The electronic apparatus according to claim 21, wherein the holding member is formed of a metal, and at least part of the holding member is in contact with the recording medium.

24. The electronic apparatus according to claim 21, wherein the flat portion of the holding member has a rectangular shape, and
wherein the intake port and the exhaust port are arranged such that images of the intake port and the exhaust port projected onto the medium substrate are at locations substantially diagonal with respect to the flat portion.

25. The electronic apparatus according to claim 21, further comprising an air blower that forms a flow of air.

26. The electronic apparatus according to claim 21, wherein the electronic apparatus includes an image pickup apparatus.

27. An electronic apparatus comprising:
a first duct that dissipates heat from an image pickup device to an outside;
a second duct that dissipates heat from an image processor to the outside; and
a third duct that dissipates heat from a recording unit to the outside,
wherein the first duct, the second duct and the third duct are arranged in parallel along an optical axis direction.

28. The electronic apparatus according to claim 27, wherein the second duct is provided with a an air blower of a single-sided suction type, and
wherein an intake port of the first duct, a connection port between the second duct and the first duct, and a connection port between the third duct and the first duct are arranged at respective locations whose images projected onto the blower are substantially diagonal across an intake portion of the air blower.

29. The electronic apparatus according to claim 27, further comprising a display unit configured to be supported on an apparatus body via a hinge portion such that the display unit can be pivotally moved with respect to the camera body in an opening/closing direction, and
wherein an intake port of the third duct is disposed in a finger putting portion that is formed to have a concave shape on a surface of the apparatus body where the display unit in a closed state is opposed to the apparatus body, and is partially exposed to an outside.

30. The electronic apparatus according to claim 29, wherein the intake port of the third duct is disposed on a side more distant from the hinge portion than a center of the display unit.

31. The electronic apparatus according to claim 27, wherein the apparatus body includes an external interface portion, and
wherein the external interface portion and the hinge portion are arranged on opposite sides of the display unit.

32. The electronic apparatus according to claim 27, wherein the first duct, the second duct, and the third duct are arranged substantially parallel to each other.

33. The electronic apparatus according to claim 27, wherein the image pickup device, the image processor, and the recording unit are arranged in parallel along the optical axis direction.

34. The electronic apparatus according to claim 27, wherein the first duct and the second duct sandwich the image processor.

35. The electronic apparatus according to claim 27, wherein the third duct is disposed between the image processor and the recording unit.

36. The electronic apparatus according to claim 34, wherein the third duct is disposed between the image processor and the recording unit.

37. The electronic apparatus according to claim 27, wherein the second duct and the third duct are connected to the first duct.

38. The electronic apparatus according to claim 27, further comprising an air blower.

39. The electronic apparatus according to claim 38, wherein the air blower takes outside air into the second duct and the third duct.

40. The electronic apparatus according to claim 38, wherein the air blower is arranged between the second duct and the third duct.

41. The electronic apparatus according to claim 27, wherein the electronic apparatus includes an image pickup apparatus.

* * * * *